United States Patent [19]
Martin et al.

[11] Patent Number: 5,811,186
[45] Date of Patent: Sep. 22, 1998

[54] UNDRAWN, TOUGH, DURABLY MELT-BONDED, MACRODENIER, THERMOPLASTIC, MULTICOMPONENT FILAMENTS

[75] Inventors: Philip G. Martin, Forest Lake; Gary L. Olson, Shoreview; Dennis G. Welygan, Woodbury, all of Minn.

[73] Assignee: Minnesota Mining and Manufacturing, Inc., St. Paul, Minn.

[21] Appl. No.: 937,107

[22] Filed: Sep. 24, 1997

Related U.S. Application Data

[63] Continuation of Ser. No. 769,097, Dec. 18, 1996, abandoned, which is a continuation of Ser. No. 450,310, May 5, 1995, abandoned.

[51] Int. Cl.$^6$ ............................................. D02G 3/00
[52] U.S. Cl. .................................... 428/373; 428/374
[58] Field of Search ............................. 428/370, 373, 428/374

[56] References Cited

U.S. PATENT DOCUMENTS

| 2,958,593 | 11/1960 | Hoover et al. . | |
|---|---|---|---|
| 3,589,956 | 6/1971 | Kranz et al. . | |
| 3,686,049 | 8/1972 | Manner . | |
| 3,687,759 | 8/1972 | Werner . | |
| 3,691,004 | 9/1972 | Werner . | |
| 3,837,988 | 9/1974 | Hennen et al. . | |
| 4,052,146 | 10/1977 | Sternberg | 425/463 |
| 4,189,338 | 2/1980 | Ejima et al. | 156/167 |
| 4,211,819 | 7/1980 | Kunimune et al. | 428/374 |
| 4,227,350 | 10/1980 | Fitzer | 51/295 |
| 4,234,655 | 11/1980 | Kunimune et al. | 428/374 |
| 4,243,576 | 1/1981 | Fischer et al. | 525/211 |
| 4,251,200 | 2/1981 | Parkin | 425/131.5 |
| 4,252,590 | 2/1981 | Rasen et al. | 156/167 |
| 4,269,888 | 5/1981 | Ejima et al. | 428/296 |
| 4,309,332 | 1/1982 | Fischer et al. | 525/170 |

(List continued on next page.)

FOREIGN PATENT DOCUMENTS

| 0586937 | 8/1993 | European Pat. Off. . |
|---|---|---|
| 43 44 805 | 7/1994 | Germany . |
| 6-185816 | 9/1985 | Japan . |
| 3-69613 | 3/1991 | Japan . |
| 7-276584 | 10/1995 | Japan . |
| 7-276588 | 10/1995 | Japan . |
| 7-90622 | 10/1995 | Japan . |
| 1095166 | 12/1967 | United Kingdom . |
| 1 300 813 | 12/1972 | United Kingdom . |
| WO 89/02938 | 4/1989 | WIPO . |

OTHER PUBLICATIONS

ASTM D882–90, STM for Tensile Properties of Thin Plastic Sheeting, pp. 315–323, dated Dec. 1990.
ASTM D2859–76, STM for Flammability of Finished Textile Floor Covering Materials, pp. 502–402 Date 1976.
ASTM D2176–63T, Tentative Method of Test for Folding Endurance of Paper by the M.I.T. Tester, pp. 745–747, dated 1963.
Textbook of Polymer Science, 2nd Ed., p. 114, dated 1971.
Experiments in Polymer Science, p. 194, dated 1973.
Encyclopedia of Chemical Technology, 3rd Ed. Supp. vol. pp. 372–392, dated 1984.
Physical Properties of Textile Fibers, pp. 268–273, dated 1962.

(List continued on next page.)

*Primary Examiner*—Newton Edwards
*Attorney, Agent, or Firm*—Daniel R. Pastirik

[57] ABSTRACT

Undrawn, tough, durably melt-bondable, macrodenier, thermoplastic, multicomponent filaments, such as sheath-core and side-by-side filaments, comprising a first plastic component and a second lower-melting component defining all or at least part of the material-air boundary of the filaments. The filaments can be made by melt-extruding thermoplastics to form hot filaments, cooling and solidifying the hot filaments, and recovering the solidified filaments without any substantial tension being placed thereon. Aggregations of the filaments can be made in the form of floor matting and abrasive articles.

15 Claims, 5 Drawing Sheets

U.S. PATENT DOCUMENTS

| | | | |
|---|---|---|---|
| 4,351,683 | 9/1982 | Kusilek | 156/167 |
| 4,384,022 | 5/1983 | Fowler | 428/296 |
| 4,406,850 | 9/1983 | Hills | 264/171 |
| 4,469,540 | 9/1984 | Furukawa et al. | 156/62.4 |
| 4,500,384 | 2/1985 | Tomioka et al. | 156/290 |
| 4,552,603 | 11/1985 | Harris, Jr. et al. | 156/167 |
| 4,610,925 | 9/1986 | Bond | 428/373 |
| 4,631,215 | 12/1986 | Welygan et al. | 428/105 |
| 4,634,485 | 1/1987 | Welygan et al. | 156/244.11 |
| 4,839,439 | 6/1989 | Mauz | 526/203 |
| 4,859,516 | 8/1989 | Yamanaka et al. | 428/92 |
| 4,893,439 | 1/1990 | McAvoy et al. | 51/400 |
| 4,912,169 | 3/1990 | Whitmire et al. | 525/221 |
| 4,913,757 | 4/1990 | Yamanaka et al. | 156/167 |
| 4,956,236 | 9/1990 | Wang | 428/373 |
| 4,985,304 | 1/1991 | Wang | 428/373 |
| 5,025,591 | 6/1991 | DeLand et al. | 49/360 |
| 5,030,496 | 7/1991 | McGurran | 428/85 |
| 5,082,720 | 1/1992 | Hayes | 428/224 |
| 5,200,261 | 4/1993 | Taguchi et al. | 428/373 |
| 5,208,105 | 5/1993 | Ichiberi et al. | 428/373 |
| 5,252,393 | 10/1993 | Fukui et al. | 428/373 |
| 5,274,035 | 12/1993 | Chundury | 525/92 |
| 5,318,805 | 6/1994 | Tanaka et al. | 428/373 |
| 5,336,552 | 8/1994 | Strack et al. | 428/224 |
| 5,405,698 | 4/1995 | Dugan | 428/370 |
| 5,453,466 | 9/1995 | Pellegatti et al. | 525/210 |
| 5,468,807 | 11/1995 | Tsurutani et al. | 525/240 |
| 5,474,820 | 12/1995 | Murschall et al. | 428/35.1 |
| 5,478,643 | 12/1995 | Peiffer et al. | 428/332 |
| 5,486,419 | 1/1996 | Clementini et al. | 428/397 |

OTHER PUBLICATIONS

Encyclopedia of Polymer Science and Engineering, vol. 6, pp. 830–831, dated 1986.

Concise Encyclopedia of Chemical Technology, pp. 380–385, dated 1985.

Bicomponent Fibers: Past, Present and Furture, INDA, JNR vol. 4, No. 4, pp. 22–26, 1992.

Encyclopedia of Chemical Technology, 4th Ed. vol. 10, pp. 541, 542, 552, dated 1993.

Plastics Week, Modern Plastics, McGraw–Hill, Aug. 9, 1993.

European Chemical News, p. 23, datd Jul. 4, 1993.

Extrusion Dies, Design and Engineering Computations, by Walter Michaeli, Hanser Publishers, pp. 173–180, dated 1984.

3M Matting Products For Food Service, 3M, dated 1993, 70–0704–2686–4 .

3M Floor Matting, 3M dated 1993, 70–0704–2694–8.

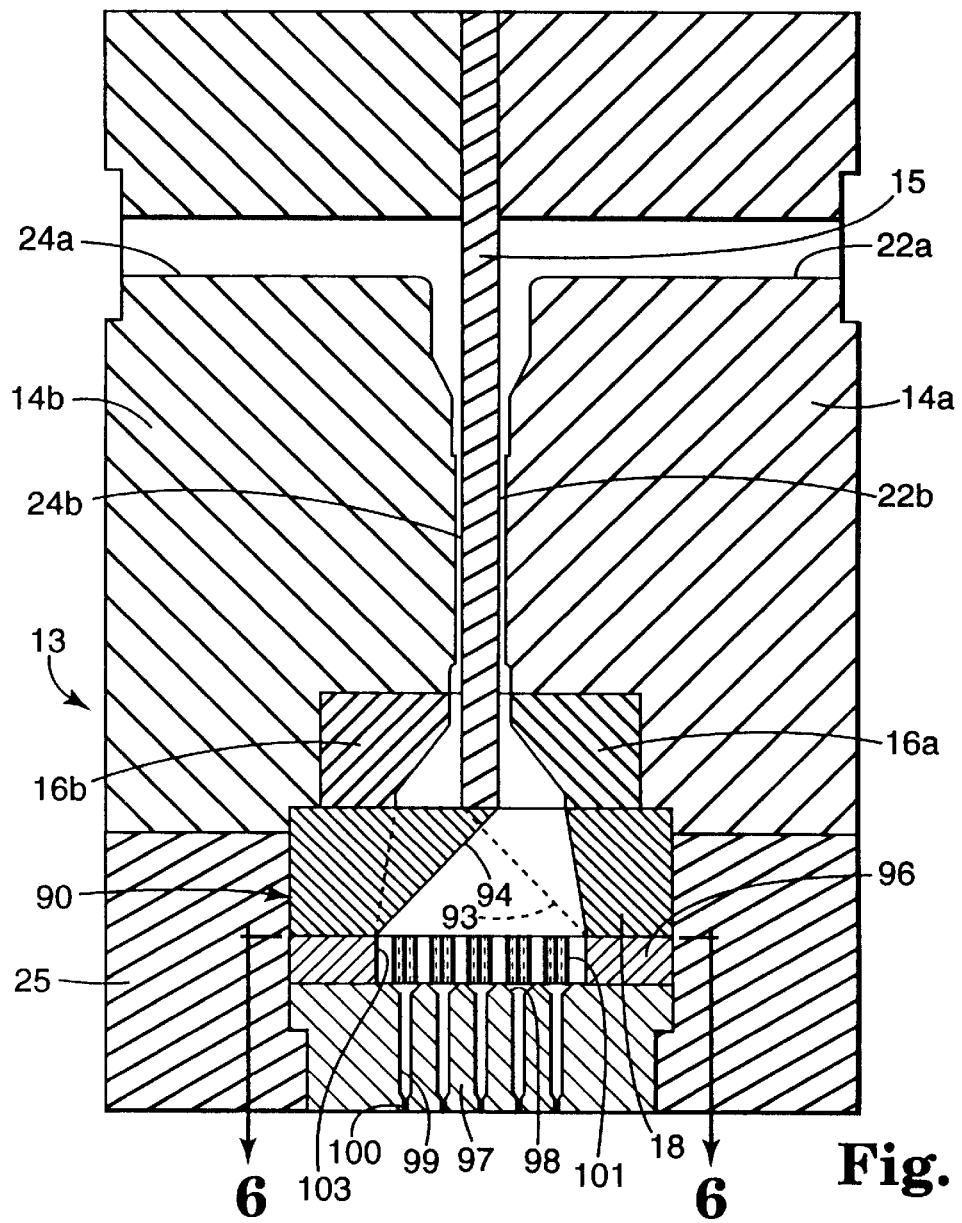
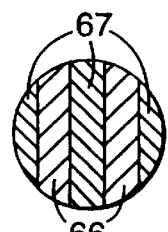
Fig. 15
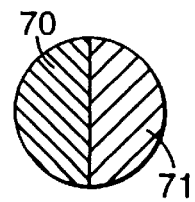
Fig. 16
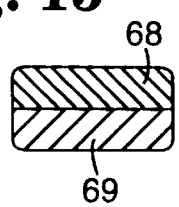
Fig. 17
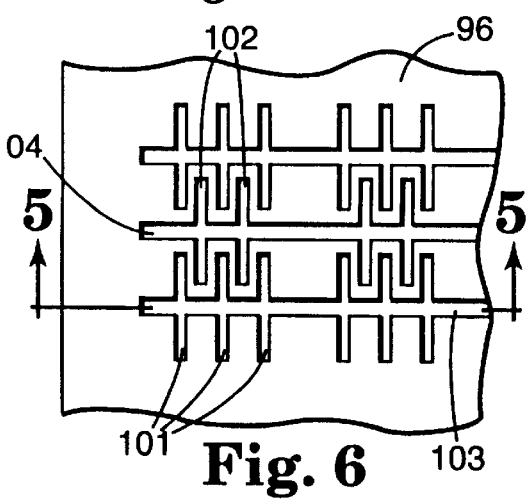
Fig. 6

UNDRAWN, TOUGH, DURABLY MELT-BONDED, MACRODENIER, THERMOPLASTIC, MULTICOMPONENT FILAMENTS

This is a continuation of application Ser. No. 08/769,097, filed Dec. 18, 1996, now abandoned which was a continuation of application Ser. No. 08/450,310, filed May 25, 1995, now abandoned.

This invention relates to melt-extruded, melt-bondable, thermoplastic filaments or fibers, particularly multicomponent fibers, such as bicomponent fibers of the sheath-core type, precursor thermoplastic polymers therefor, and articles of such filaments or fibers, such as open, nonwoven webs useful in the form of entry-way floor matting or abrasive pads. In another aspect, this invention relates to methods of making said filaments or fibers and articles thereof In a still further aspect, this invention relates to thermoplastic alternatives for poly(vinyl chloride).

Fibers based on synthetic organic polymers have revolutionized the textile industry. One manufacturing method of fiber formation is melt spinning, in which synthetic polymer is heated above its melting point, the molten polymer is forced through a spinneret (a die with many small orifices), and the jet of molten polymer emerging from each orifice is guided to a cooling zone where the polymer solidifies. In most instances the filaments formed by melt spinning are not suitable textile fibers until they have been subjected to one or more successive drawing operations. Drawing is the hot or cold stretching and attenuation of fiber filaments to achieve an irreversible extension and to develop a fine fiber structure. Typical textile fibers have linear densities in the range of 3 to 15 denier. Fibers in the 3 to 6 denier range are generally used in nonwoven materials as well as in woven and knitted fabrics for use in apparel. Coarser fibers are generally used in carpets, upholstery, and certain industrial textiles. A recent development in fiber technology is the category of microfibers with linear densities <0.11 tex (1 denier). Bicomponent fibers, where two different polymers are extruded simultaneously in either side-by-side or skin/core configurations, are also an important category of fibers. *Kirk-Othmer Encyclopedia of Chemical Technology*, Fourth Ed., John Wiley & Sons, N.Y., Vol. 10, 1993, "Fibers," pp. 541, 542, 552.

A type of bicomponent fiber is the bicomponent binder fiber, the historical paper by D. Morgan which appears in INDA *Journal of Nonwoven Research*, Vol. 4(4), Fall 1992, pp. 22–26. This review article says it is worth noting that the majority of bicomponent fibers so far made have been side-by-side acrylics used in knitwear garments to provide bulk. Table 1 of this review article lists suppliers of various bicomponent fibers, which are of relatively low denier, ranging from about 1 to up to 20.

U.S. Pat. Nos. 4,839,439 (McAvoy et al.) and 5,030,496 (McGurran) describe nonwoven articles prepared by blending melt bondable, bicomponent sheath/core, polyester, staple fibers having a denier of six and larger, for example 15, with synthetic, organic, staple fibers, forming a nonwoven web from the blend, heating the web to cause the melt bondable staple fibers to initially bond, or prebond, the web, coating the web with a binder resin, and drying and heating the coated web.

U.S. Pat. No. 5,082,720 (Hayes) discusses prior art relating to nonwoven webs of bicomponent melt-bondable fibers. The invention of the Hayes patent is directed to drawn or oriented, melt-bondable, bicomponent filaments or fibers of 1 to 200 denier formed by the co-spinning of at least two distinctive polymer components, e.g., in a sheath-core or side-by-side configuration, immediately cooling the filaments after they are formed, and then drawing the filaments. The first component is preferably at least partially crystalline polymer and can be polyester, e.g., polyethylene terephthalate; polyphenylenesulfide; polyamide, e.g., nylon; polyimide; polyetherimide; and polyolefin, e.g., polypropylene. The second component comprises a blend of certain amounts of at least one polymer that is at least partially crystalline and at least one amorphous polymer, where the blend has a melting point of at least 130° C. and at least 30° C. below the melting point of the first component. Materials suitable for use as the second component include polyesters, polyolefins, and polyamides. The first component can be the core and the second component can be the sheath of the bicomponent fiber.

Filaments of poly(vinylchloride) ("PVC," or simply "vinyl"), a synthetic thermoplastic polymer, are used to make open or porous, nonwoven, three-dimensional, fibrous mats or matting. The mats are used for covering any of a variety of floors or walking surfaces, such as those of office building, factory, and residential entry-ways or foyers and hallways, areas around swimming pools, and machine operator stations, to remove and trap dirt and water from the bottom (soles and heels) of shoes, protect floors and carpets, reduce floor maintenance, and provide safety and comfort. Generally the mats are open or porous webs of interengaged or intertwined, usually looped, sinuous, or coiled, coarse or large-diameter fibers (or filaments); such fibers are typically melt-extruded from plasticized PVC into single-component fibers which are aggregated and bonded (usually with an applied binder coating or adhesive). An example of commercially-available matting product is Nomad™ matting constructed of interengaged loops of vinyl filaments that are bonded together and may be supported on and adhered to a backing—see product bulletins 70-0704-2684-4 and 70-0704-2694-8 of the 3M Company, St. Paul, Minn., U.S.A.

Relatively early patents describing matting made from various thermoplastics including PVC are U.S. Pat. Nos. 3,837,988 (Hennen et al.), 3,686,049 (Manner et al.), 4,351,683 (Kusilek), and 4,634,485 (Welygan et al.). Common aspects of the method described in these patents, briefly stated, comprises extruding continuous filaments of thermoplastic polymer downward toward and into a water quench bath where a web of interengaged, integrated, or intermingled and spot-bonded filaments is formed. The web can be subsequently treated with bonding agent or resin to improve bonding, strength, or integration. Typically, in the absence of a bonding agent or resin applied and cured subsequent to the web-forming step, the filaments of the web exhibit a tensile strength much greater than that of the spot-bond itself That is, as a result of tensile force applied to the web after spot welding but before application of a subsequent bonding treatment, the fibers of the web will separate at the sites of interfilament bonding more frequently than the fibers will break.

Recently poly(vinyl chloride) has been said to be environmentally undesirable because its combustion products include toxic or hazardous hydrogen chloride fumes. It has been reported that the existing use of PVC in Sweden should be phased out by the year 2000—see European Chemical News, 4 Jul. 1994, p. 23. One Swedish commercial enterprise stated it plans to stop making PVC-based elastic flooring and launch a new, PVC-free flooring—see Plastic Week, Aug. 9, 1993. Thus attention is being directed to alternatives for PVC.

Bicomponent fibers and multicomponent fibers are described in *Kirk-Othmer Encyclopedia of Chemical Technology*, Third Ed., Supplement Vol., 1984, pp. 372–392, and *Encyclopedia of Polymer Science and Technology*, John Wiley & Sons, N.Y., Vol. 6, 1986, pp. 830, 831. Patents describing certain multicomponent or bicomponent fibers include U.S. Pat. Nos. 3,589,956 (Kranz et al.), 3,707,341 (Fontijn et al.), 4,189,338 (Ejima et al.), 4,211,819 (Kunimune), 4,234,655 (Kunimune et al.), 4,269,888 (Ejima et al.), 4,406,850 (Hills), 4,469,540 (Jurukawa et al.), 4,500,384 (Tomioka et al.), 4,552,603 (Harris et al.), 5,082,720 (Hayes), 5,336,552 (Strack et al.). The process of manufacture of multicomponent fibers and a general discussion of the method of extrusion of these fibers are also described in *Kirk-Othmer*, Third Ed., loc. cit. Some patents describing spinneret assemblies for extruding bicomponent fibers of the sheath-core type are U.S. Pat. Nos. 4,052,146 (Sternberg), 4,251,200 (Parkin), 4,406,850 (Hills), and PCT International Appln. published as WO 89/02938 (Hills Res. & Devel. Inc.).

Some other patent filings, viz., U.S. Pat. Nos. 3,687,759 (Werner et al.) and 3,691,004 (Werner et al.), though they do not describe PVC matting, describe mattings of filaments of substantially amorphous polymer, such as polycaprolactam, which are formed by melt spinning into a liquid quench bath in such a manner that the filaments lie in the form of overlapping loops randomly bonded at their points of contact as they solidify in the bath. These patents state that preferably the filaments are spun, looped, and bonded without any substantial tension being placed on the filaments, or that it is preferable to avoid any substantial tension capable of stretching the filaments as they are withdrawn through the cooling bath so that the amorphous character of the initial polymer is largely retained. Matting articles which are formed without spinning into a liquid quench bath and consisting essentially of melt-spun filaments which are self bonded or fused at random points of intersection without using any bonding agent have been described in U.S. Pat. No. 4,252,590 (Rasen et al.).

A series of patents issued to Yamanaka et al., viz., U.S. Pat. Nos. 4,859,516, 4,913,757, and 4,95,265, describe various mats consisting of filament loop aggregations formed by extruding thermoplastic synthetic resin vertically toward the surface of a cooling bath of water at a speed regulated by guide rollers disposed in the water (to which a surface active agent can be added), the density of the aggregations of the resulting bonded or fused aggregations being regulated in certain manners.

This invention, in one aspect, provides undrawn, tough, durably melt-bondable, thermoplastic, macrodenier, multicomponent filament comprising, consisting, or consisting essentially of the following components:

(a) first plastic comprising synthetic organic plastic polymer, preferably a thermoplastic, which can be semicrystalline, such as nylon 6; and (b) second plastic comprising synthetic organic thermoplastic polymer, such as ethylene-vinyl acetate copolymer or a blend of an ethylene-vinyl acetate copolymer and an ethylene-methyl acrylate copolymer, which melts upon heating at a temperature lower than the temperature which melts component (a), e.g., at least 15° C. lower, preferably 30° C. lower, and is generally amorphous or semicrystalline; said components (a) and (b) being, along the length of the filament, elongated, contiguous, coextensive in length, and, preferably, integral and inseparable (e.g., in boiling water), said component (b) defining all or at least part (e.g., 5 to 90%, preferably 20–85%) of the material-air boundary or peripheral or external surface of the filament. The plastic of each of said components (a) and (b) can be a single plastic substance or a blend of a plurality of plastic substances and can consist or consist essentially of such plastic substances. Said components can further comprise or have incorporated adjuvants or additives to enhance a property of or impart a property to the filament, such as stabilizers, processing aids, fillers, coloring pigments, crosslinking agents, foaming agents, and fire retardants. The filament can comprise a plurality, e.g., 2 to 5, of components (a) and/or of components (b), a preferred multicomponent filament being a bicomponent filament, such as a sheath-core or side-by-side filament.

Another aspect of this invention provides a method of making the above-described multicomponent filaments. Such method comprises continuous steps of simultaneously (or conjointly) melt-extruding, preferably at the same speed, molten streams of thermoplastic polymers (some of which are novel blends of polymers) as precursors of components (a) and (b) via one or a plurality, e.g., 1 to 2500, preferably 500 to 1800, extruder die openings or orifices, in the form of a single or a plurality of discrete and separate hot, tacky, molten, multicomponent filaments, cooling them, for example, in a water quench bath, and recovering the resulting non-tacky, solidified filaments, for example, as a tow or web of such filaments.

In another aspect of this invention, a plurality of the above-described solidified filaments are self-bonded to one another by heating an aggregation thereof, e.g., in the form of an open, nonwoven web of the filaments in a coiled form, to or above the melting point of component (b) in order to effect durable melt-bonding at filament surfaces in contact with melted component (b), and thereby provide a sufficiently bonded aggregation of the filaments, e.g., an open, nonwoven web of durably melt-bonded, undrawn, tough, macrodenier, multicomponent filaments. Such bonding can be accomplished without requiring or using a coating or otherwise applying to the filaments a binder resin, solvent, or extra adhesive or mixing the filaments with so-called binder fibers, though such materials may be used to supplement the self-bonding of the filaments.

The filaments of this invention, following their melt-extrusion and cooling to a solidified form, are not subsequently or additionally drawn, that is, stretched, pulled, elongated, or attenuated. In contrast, textile fibers, including bicomponent textile fibers, are commonly drawn as much as, for example, 2 to 6 or even 10 times their original length, usually to increase their strength or tenacity.

The filament of this invention, as that term is used herein, is an elongated or slender article which is narrow or small in width, cross section, or diameter in proportion to its length. Generally the filament can have a width, diameter, or cross-section dimension of at least 0.2 mm, preferably at least 0.4 mm, which dimension generally will be in the range of 0.5 to 25 mm, preferably 0.6 to 15 mm, such dimension (and shape of the cross section) being preferably substantially or essentially uniform along the length of the filament, e.g., uniformly round. The surface of the filament is typically smooth and continuous. Because the filament is larger in cross section in comparison to bicomponent textile-size or textile-denier filaments or "fine" fibers (which are generally considered to be 1 to 20 denier per fiber or "dpf"), the filament of this invention is relatively coarse and can be characterized (especially as compared to textile fibers) as being or having a macrodenier (and can even be characterized as being a macrofilament). Generally the filament of this invention has a linear density greater than 200 dpf and as much as 10,000 dpf or more, e.g., up to 500,000 dpf, but preferably the filaments of this invention have linear densities in the range of 500 to 20,000 dpf The multicomponent filaments of this invention can be in the shape or form of fibers, ribbons, tapes, strips, bands, and other narrow and long shapes. Aggregations of the filaments, such as open, nonwoven webs, can be made up of a plurality of filaments with the same or different plastic compositions, geometric shapes, sizes and/or deniers. A particular form of such filaments is side-by-side (or side-side) bicomponent filaments or, preferably, sheath-core (or sheath/core) bicomponent filaments, each comprising said components (a) and (b) with one or more (e.g., 1 to 9) interfaces between the components and with the material-air boundary of the filament defined at least in part by an external surface of component (b). In a typical sheath-core filament, the sheath, component (b), provides a matrix (with a continuous external surface, the filament's material-air boundary) for one or more components (a) in the form of cores. The filaments can be solid, hollow, or porous and straight or helical, spiral, looped, coiled, sinuous, undulating, or convoluted. They can be circular or round in cross section or non-circular or odd in cross section, e.g., lobal, elliptical, rectangular, and triangular. They can be continuous in length, that is, of indefinite length, or, by cutting them in that form, they can be made in a short, discontinuous, or staple form of definite length. The components (a) and (b) can be solid or noncellular, or one or both components can be cellular or foamed with open and/or closed cells. Both of the components (a) and (b) can have the same form or shape or one of them can have one form or shape and the other component can have a different form or shape.

In characterizing the multicomponent filament of this invention as durably melt-bondable, this means that a plurality or aggregation of such filaments, such as an open, non-woven web, can be bonded together at their points of contact or intersection to form an interfilament-bonded structure by heating the filaments sufficiently to or above the melting point of their component (b) in order to melt component (b) without melting their component (a), and then cooling the filaments to solidify component (b), thereby causing the filaments to become bonded, to one another by a bond of component (b) at each of their contiguous material-air boundaries, points of contact, or intersections. Such melt-bonding of the filaments is a self-bonding in that it is effected without using or requiring the application of an external bonding agent, or solvent, or adhesive coating applied to the filaments or mixing so-called binder fiber therewith. This self-bonding feature is thus an environmental or cost advantage of the filaments of this invention vis-a-vis those known filaments or fibers that use or require such agent, solvent, coating, or binder fiber for bonding. This self-bonding may additionally be characterized and differentiated from spot- or tack-bonding, spot welding, or removably-welding by the strength of the bond formed. The melt-bond achieved by the filaments of this invention is a durable bond in that it is sufficiently strong or fracture resistant that interfilament melt-bond strength generally is at least as great as that of the strength of the filament itself, and generally the melt bond strength exceeds 1.4 MPa, and preferably is at least 4.8 MPa (ca 700 psi), based on the cross-section area of the filament before breaking stress is applied thereto. In a tack-bonded structure, such as that of an open, nonwoven web of coiled filaments, tack-bonded filaments can be relatively easily separated from the structure, e.g., by a pulling stress of less than 0.02 MPa (ca 3 psi), based on the cross-section area of the filaments before breaking stress is applied thereto, without distorting or breaking the filaments themselves. The fact that melt-bonded filaments of this invention themselves break, rather than their melt-bonds, attests to the durably melt-bondable character of the filaments (as well as to the durable melt-bonded character of a melt-bonded aggregation of the filaments, such as an open nonwoven web). Furthermore, the multicomponent nature of the filaments provides an unexpected advantage by allowing component (a) thereof to provide a structural role in supporting the shape of the web of such filaments in either a post-formation melt-bonding step.

Because the filaments of this invention are self- or melt-bondable, webs formed from the melt-bonded filaments of this invention are durable without requiring the application of binding agent, or adhesive coating, or solvent and can be used for article fabrication once the webs are melt-bonded. Contrariwise, many nonwoven webs made in whole or part from so-called binder fiber, which are typically textile-size fibers, e.g., 3 to 15 dpf, are often additionally bonded, strengthened, or reinforced with binder resins that are roll- or spray-coated on the thermally-bonded web, especially when durability and toughness are needed.

The multicomponent filaments of this invention may be fabricated into filamentary articles or structures or three-dimensional aggregations comprising a plurality of the filaments, which can be in either continuous or staple form. For example, said aggregations may be in the form of open, permeable or porous, lofty webs or batts of interengaged, intertwined, interlocked, or entangled filaments or twisted, woven, or braided filaments that can be generally straight or helical, spiral, looped, coiled, curly, sinuous or otherwise convoluted filaments which can extend from one end of the web to the other end. The contiguous material-air boundaries of the filaments can be melt-bonded at their points of intersection or contact to form a water permeable, lofty or low bulk density, unitary, monolithic, coherent or dimensionally-stable, three-dimensional filamentary structure or mass, such as an open, nonwoven web, minimal, or any, melted thermoplastic filling up the interfilament gaps or interstitial spaces of the structure. Webs can be cut to desired sizes and shapes, for example, in lengths and widths useful, for example, as floor covering or door mats for building entrances and other walkway surfaces. If desired, the web can be first melt-bonded on one side to suitable backing, such as a thermoplastic sheeting, prior to cutting into mats. Such masses, aggregations, or structures, when used as matting, provide resilient cushioning in the form of lofty, open, low bulk density, pliable mats or pads to cover floors or walking surfaces to protect the same from damage by dirt, liquid, or traffic wear, to provide safety and comfort to those people who walk or stand thereon, and to improve the aesthetic appearance of such substrates. Such mats can be stood or walked upon by people over a very long time with comfort and safety and without losing their durability. The mats are preferably of such low bulk density or high void volume that, in holding them up to a light source, light can be seen therethrough and dirt or water tracked thereon readily falls or penetrates therethrough. Generally, such mats can be used where PVC matting has been or can be used and as an alternative thereto, and, specifically, for those applications described in the above-cited 3M Company bulletins, which descriptions are incorporated herein by reference. The filamentary mass or web of this invention can also be used as a spacer or cushioning web, a filter web, as the substrate of scouring pads, erosion-control or civil engineering matting for retaining soil on embankments, dikes, and slopes and the like to protect them from erosion, as a substrate or carrier for abrasive particles and the like, and as a reinforcement for plastic matrices.

The multicomponent filaments of this invention can be fabricated with indeterminate length, that is, in truly continuous form and, if desired, made as long in length as the supply of melt precursor or feed thereof lasts and having a length dependent only on the limitations of the fabricating equipment. Webs formed from these continuous filaments can be readily cut to desired dimensions, for example, after they are intertwined or intermeshed as looped or coiled, bonded filaments in the form of an open, nonwoven web or matting. Alternatively, these continuous filaments can be cut into staple length fibers, for example, 2.5–10 cm in length, and such short lengths can used, for example, in a bonded aggregation as a substrate for abrasive cleaning and polishing pads in applications like those whose fabrication is described in said U.S. Pat. No. 5,030,496 and U.S. Pat. No. 2,958,593 (Hoover et al.), which descriptions (except for the requirement of an adhesive coating) are incorporated herein by reference.

Preferably the filaments of this invention are melt-extruded as a bundle or group of free falling, closely spaced, generally parallel, discrete, continuous, multicomponent filaments of hot, tacky, deformable, viscous polymer melts, for example, as sheath-core bicomponent fibers, the hot filaments then being quickly cooled, or quenched, to a non-tacky or non-adhesive solid state. The hot filaments can be so-cooled or quenched to form a tow of non-tacky, essentially solid, discrete continuous filaments by contact with a cooling means or medium, such as a liquid quench bath, e.g., a body of water. The tow can then be advanced or conveyed through the bath and withdrawn therefrom. The tow may then be further cooled, if desired. The tow can be used to fabricate nonwoven pads, such as those whose fabrication is described in U.S. Pat. No. 5,025,591 (Heyer et al.), used for scouring pots and pans, etc., or the tow can be cut into staple lengths which can be used to make abrasive pads, such as those whose fabrication is described in U.S. Pat. No. 2,958,593 (Hoover et al.), which descriptions (except for the requirement of an adhesive coating) are incorporated herein by reference. If the speed at which the tow is withdrawn from the quench bath, i.e., the take-away speed, is equal to or greater than the speed of the hot filaments entering the quench bath, the tow will comprise essentially straight, non-coiled, non-convoluted, discrete filaments.

A tow comprised of helically shaped, coiled, or convoluted, discrete, continuous, multicomponent filaments, one such filament being shown in FIG. 4, can be formed in the above-described fashion if the tow is conveyed through the quench bath at a take-away speed which is less than the speed of the filaments entering the quench bath so as to permit the falling, molten, still deformable filaments to coil into an essentially helical shape adjacent the surface of the quench bath. The free-falling molten filaments preferably are sufficiently spaced-apart to prevent individual filaments from interfering with the coiling action of adjacent filaments. The use of a surfactant (for example, as described in said U.S. Pat. No. 3,837,988) in the quench bath may be desirable to aid coil formation.

A web of coiled, multicomponent filaments can be formed by permitting the bundle of melt-extruded, free-falling filaments to (i) deform, coil, wind, or oscillate in a sinuous manner, (ii) interengage, intertwine, or aggregate in a desired ordered or random pattern to a desired web weight, (iii) tack- or spot-bond upon contact with each other, and (iv) immediately thereafter cool to a non-tacky, solid state. The free-falling molten filaments in the bundle are sufficiently spaced-apart to allow intermingling of the coiling and overlapping filaments. The take-away speed of the web preferably is sufficiently slow relative to the speed of the filaments entering the quench bath so as to allow the falling, coiling filaments to aggregate adjacent the surface of the quench bath as described in said U.S. Pat. No. 4,227,350 or alternatively to aggregate on one or more contact surfaces adjacent the surface of the quench bath. The contact surface (s) may be in motion, as for example the surface of a rotating cylindrical drum as described in said U.S. Pat. No. 4,351,683, so as to collect the newly-forming web and help convey it into and/or through the quench bath. The substrate may alternatively be stationary, for example, a plate as described in said U.S. Pat. No. 3,691,004. (Said descriptions of said U.S. Pat. Nos. 4,227,350, 4,351,683, and 3,691,004 are incorporated herein by reference.) The lightly-unified web thus formed comprises overlapping or entangled loops or coils of filaments and has sufficient structural integrity to allow the web to be conveyed, transported, or otherwise handled. The web can be dried and stored if necessary or desired prior to the melt-bonding step. This melt-bonding step involves heating the lightly-unified web to cause melting of the lower-melting plastic of component (b) without deforming component (a), and then cooling the web to re-solidify component (b) in order to effect melt-bonding at points of intersection of the filaments to form an open, durably melt-bonded web.

In the above-described methods of fabricating multicomponent filaments of this invention, unlike methods commonly used to manufacture single component or bicomponent fibers, such as textile fibers, the multicomponent filaments of this invention, as stated above, are undrawn. That is, the filaments of this invention are not mechanically, aerodynamically, or otherwise drawn, stretched, or pulled after they are quenched. The filaments, after having been quenched, are not attenuated, as for example, with a mechanical draw unit, air aspirator, air gun, or the like, so as to reduce their diameter, width, or cross-sectional area . After the hot filaments are cooled and solidified from their hot, tacky, molten state to their non-tacky, solidified state, their diameters, widths, or cross-sectional areas and shape remain substantially or essentially the same in their finished state, that is, after tow collection or web formation and subsequent melt-bonding steps, as when first cooled to the solid state. In other words, although the cooled and solidified filaments can be thereafter aggregated, melt-bonded, conveyed, wound, or otherwise handled or processed, such handling is done in a relatively relaxed manner without any substantial tension being placed on the solidified filaments. Thus, once solidified, the filaments of this invention are processed in an essentially tension-less manner, without substantial or significant attenuation, so that their denier or magnitude after processing to their finished form can be essentially the same as that upon first cooling the viscous filaments; consequently, the filaments are said to be undrawn.

Notwithstanding the multicomponent filaments of this invention are undrawn, they are tough, that is, strong and flexible but not brittle or fragile, and the melt-bonded aggregations of such filaments are durable, that is, resistant to fatigue due to constant flexing, even though their bonding is achieved without use of an added or applied bonding or adhesive agent, such as coating with an adhesive coating solution or mixing the filaments with added known binder fibers. In contrast to drawn fibers, the cooled, solidified filaments of this invention can be readily stretched or drawn by grasping such a filament by two hands—one on each end of a segment (e.g., 10 cm long)—and pulling the segment between them, for example, to 2 or more times its initial length, thereby attenuating the filament diameter or cross-sectional area.

Because of the non-PVC thermoplastics which can be used to fabricate the multicomponent filaments of this invention, environmental regulations which restrict the use of PVC will not necessarily be applicable to the fabrication, use, or disposal of the filaments of this invention. Another environmental advantage is that no adhesive or volatile solvents are required to durably bond the filaments of this invention in the form of a unitary or monolithic structure, such filaments being self-bondable, that is, melt-bonding at their contiguous material-air boundaries or surfaces that are heated to melt the lower melting plastic of component (b) of such filaments and thermally bond the same at said boundaries or surfaces.

BRIEF DESCRIPTION OF THE DRAWINGS

In the accompanying drawing, which depicts or illustrates some embodiments and or features of this invention, and where like reference numbers designate like features or elements:

FIG. 5 is a schematic view in elevation and cross section of a portion of another extruder die assembly useful in the apparatus of FIGS. 1A–1D;

FIG. 6 is a partial cross-section and enlarged view of FIG. 5 taken along the line 6—6 thereof.

FIGS. 15 to 17 are schematic cross-sections of side-by-side multicomponent filaments of this invention;

Figure 1A:
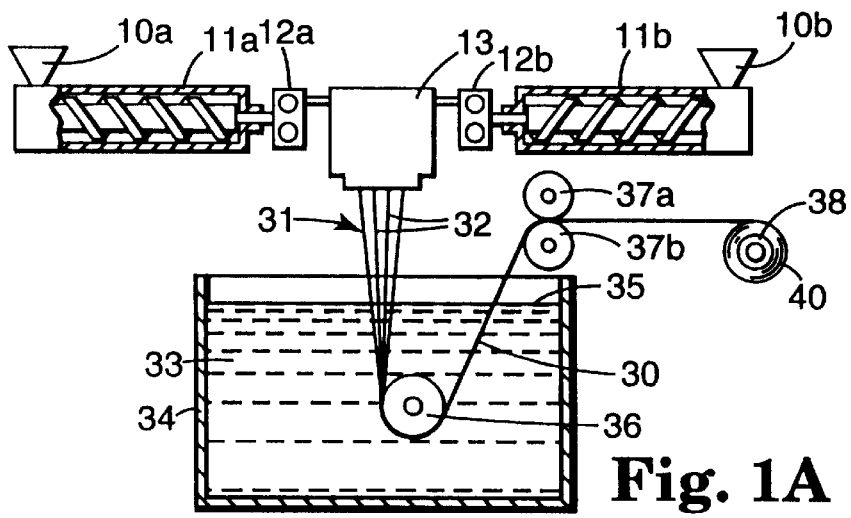
FIG. 1A is a schematic view in elevation and partial cross-section showing one embodiment of apparatus that can be used to make a tow of straight or uncoiled, multicomponent filaments of this invention.

Referring now to the drawing, and initially to FIG. 1A, a first thermoplastic polymer composition, to be used to form component (a) of bicomponent filaments of this invention, is fed in pellet, crumb, or other form into the hopper 10a of a melt extruder 11a, from which a stream of polymer melt (e.g., at 100° to 400° C.) is fed, optionally under pressure of a metering pump 12a, into a bicomponent extrusion die assembly 13. Similarly, a second thermoplastic polymer composition to be used to form component (b) of the bicomponent filaments is fed into the hopper 10b of melt extruder 11b, from which a stream of polymer melt is fed, optionally under pressure of metering pump 12b, into the extrusion die assembly 13. Examples of equipment for extruding bicomponent fibers are described in *Kirk-Othmer*, Third Ed., Supp. Vol. supra, p. 380–385. Examples of extrusion die assemblies in the form of spinnerets are described in U.S. Pat. Nos. 4,052,146 (Sternberg), 4,406,850 (Hills) and 4,251,200 (Parkin), PCT Appln. WO 89/02938 (Hills Research and Development Inc.), and Brit. Pat. 1,095, 166 (Hudgell). Examples of extrusion dies are described by Michaeli, W. in *Extrusion Dies, Designs and Computations*, Hanser Pub., 1984, pp. 173–180. These descriptions of technology are incorporated herein by reference, and the equipment therein can be modified in dimensions and configuration by those skilled in the art for use in extruding the macrodenier, multicomponent filaments of this invention in light of the description of it herein.

Figure 2A:
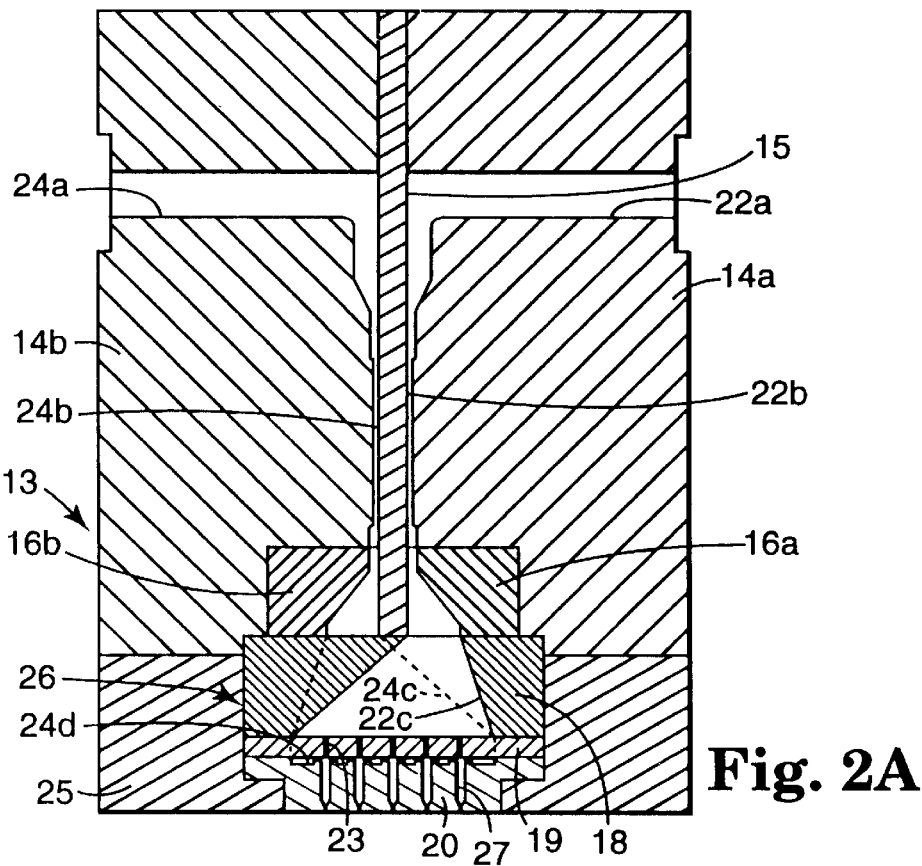
FIG. 2A is a schematic view in elevation and cross section of a portion of an extruder die assembly useful in the apparatus of FIGS. 1A–1D for melt-extruding sheath-core filaments of this invention.
Figure 2B:
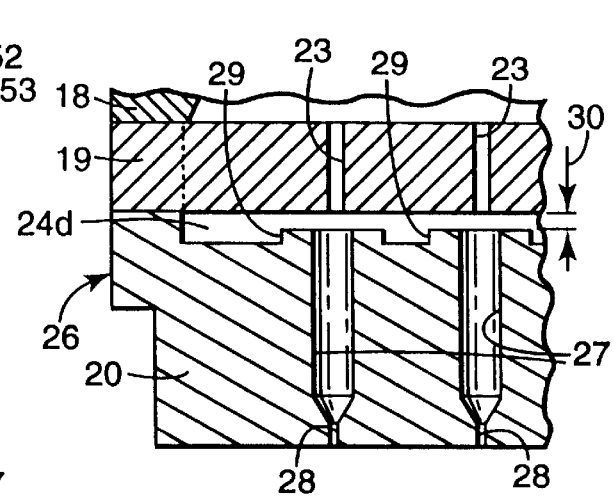
FIG. 2B is a enlarged view in cross section of a portion of FIG. 2A.

FIGS. 2A and 2B illustrate the bicomponent, filament, extrusion die assembly 13 of FIG. 1A, such assembly being made of a number of machined metal parts having various chambers, recesses, and passages for the flow of molten thermoplastic and rigidly held together by various means (not shown in the drawing), such as bolts. Assembly 13 comprises a dual-manifold of the slit type made up of mating blocks 14a and 14b each having a manifold passage disposed therein and separated by a vertical plate 15. Manifold blocks 14a and 14b are provided with opposing recesses at the lower ends in which is inserted a mating pair of prelip blocks 16a, 16b with flared, opposed inner surfaces separated by the lower portion of plate 15. Blocks 14a, 14b surmount a lower die holder 25 having a recess to accommodate an inserted extrusion die pack 26 of the castellation type and comprising stacked plates, viz., top plate 18, center or distribution plate 19, and lower or orifice plate 20 from which issue hot, viscous, tacky, sheath-core filaments formed in the pack. Viscous core polymer composition, component (a) of the filaments, is caused to flow from a feed passage 22a within manifold block 14a to distribution manifold passage 22b and thence into chamber 22c in top plate 18 that functions as a local manifold from which the core polymer melt flows into an array of vertical core flow passages 23 in plate 19. Viscous sheath polymer composition, component (b) of the filaments, is simultaneously caused to flow from a feed passage 24a within dual manifold block 14b to a second polymer distribution manifold passage 24b and thence into a second and separate chamber 24c in top plate 18 that functions as a local manifold from which the sheath polymer melt flows downwardly through a rectangular channel (shown by the broken line) in center plate 19 to a horizontal recess or cavity 24d disposed between center plate 19 and orifice plate 20. The latter has an array of circular vertical channels 27 axially aligned with core flow passages 23. Channels 27 communicate at their upper ends with recess 24d and terminate at their lower ends with extruder nozzles having orifices 28. As shown clearly in FIG. 2B, the upper face of the orifice plate 20 defining the bottom of recess 24d is machined with an array of raised, circular protuberances, buttons, or castellations 29, each surrounding the upper or inlet end of a channel 27 and defining a fine gap 30 between their upper surface and the lower face of distribution plate 19 (or top of recess 24d) to ensure uniform sheath thickness. The sheath melt flows in fine gap 30 and enters channels 27 around the respective streams of core melt flowing from passages 23 into the cores of the channels so that bicomponent sheath-core filaments issue from orifices 28, the cross section of such a filament being shown in FIG. 7.

Referring again to FIG. 1A, the extruder die assembly 13 continuously extrudes downwardly, in relatively quiescent air, a plurality or bundle 31 of hot, viscous, tacky, closely-spaced, discrete, continuous, macrodenier, multicomponent filaments 32 which fall freely into a body or bath 33 of quench liquid, such as water, in an open-top tank 34. The surface 35 of the bath 33 is disposed a suitable distance below the lower face of the extrusion die assembly 13 in order to maintain the discrete nature of falling filaments in the zone of cooling air above the bath. The bundle 31 upon entering the bath 33 is quickly cooled or quenched from the extrusion temperature, e.g., 100° to 400° C., down to about 50° C., and solidified to a non-tacky state. The discrete, quenched filaments 32 are continuously gathered or collected and are guided around turnaround roll 36 as a tow 30 which is conveyed by a pair of pinch rolls 37a and 37b out of the bath. The tow 30 may then be wound on winder 38 to form a tow winding 40.

Figure 1B:
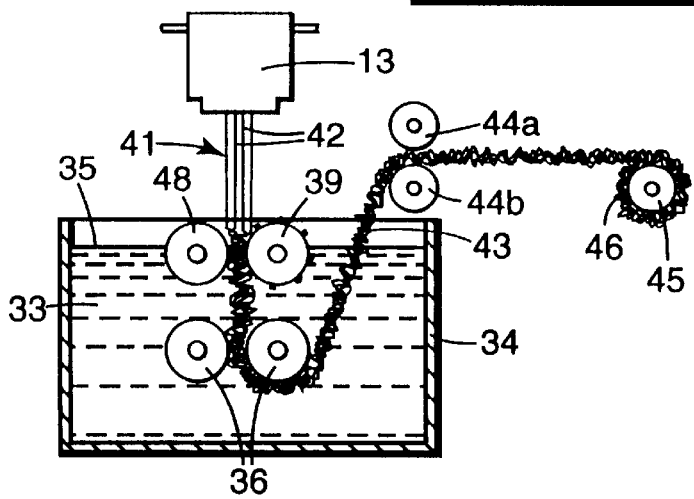
FIG. 1B is a schematic view in elevation and partial cross-section showing another embodiment of apparatus that can be used according to this invention to make coiled multicomponent filaments and an open, nonwoven web thereof.
Figure 3:
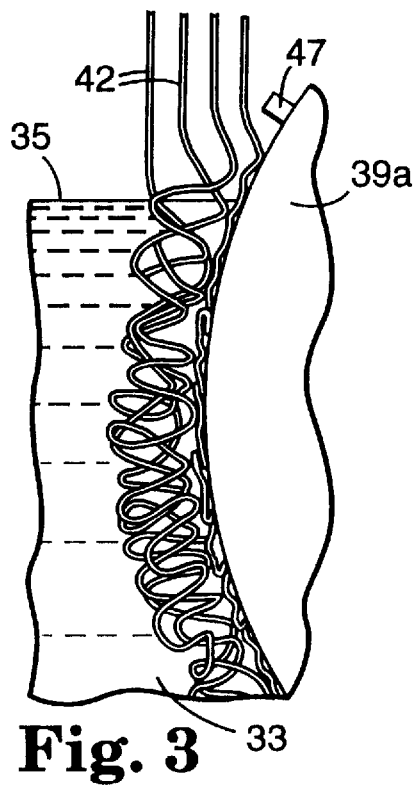
FIG. 3 is a enlarged view of a portion of FIG. 1B.
Figure 4:
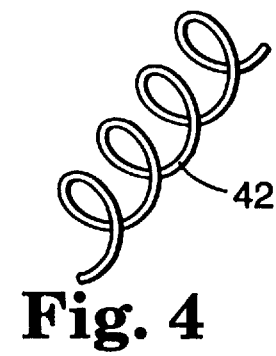
FIG. 4 is a schematic isometric view of a single multicomponent filament of this invention in its helical or coiled form.

In a similar fashion, referring now to FIG. 1B, the extruder die assembly 13 (which, as in FIG. 1A, is connected to extruders and optionally to metering pumps, not shown in FIG. 1B) extrudes downwardly a plurality or bundle 41 of hot, viscous, tacky, closely-spaced, discrete, continuous, macrodenier, multicomponent filaments fibers 42 which fall freely in the quiescent ambient air into tank 34. The bundle 41 can be aligned so that some of the hot, viscous filaments 42 are permitted to make glancing contact with the outer surface of a guide roll 39, optionally provided with spaced-apart guide pins or pegs 47 (see FIG. 3), or some other type of guide, such as a stationery plate, to guide the hot, viscous filaments as they move toward the surface 35 of a body or bath 33 of quench liquid, such as water, in tank 34, the surface of the liquid being disposed a suitable distance below the lower face of the extruder die assembly of 13 so as to achieve the desired diameter of the filaments as they enter the bath. The roll 39 can be set to cause glancing contact with the filaments 42, as described in said U.S. Pat. No. 4,351,683, which description is incorporated herein by reference. As the hot, viscous filaments 32 fall in the ambient air, they begin to cool from the extruding temperature (which can range, for example, from 100° C. to 400° C.). The guide roll 39 (as well as optional roll 48 and other rolls downstream) can be set to rotate at a predetermined speed or rate such that the rate of lineal movement of the filaments 42 as they enter the body 33 of quench liquid is slower than the rate of linear movement of the hot, viscous filaments upstream of the guide roll(s). Since the take-away speed is slower than the speed of the hot filaments entering the quench bath 33, and the filaments 42 are still in a sufficiently viscous, deformable, or molten state, the filaments accumulate or aggregate themselves by coiling, undulating, or oscillating and interengaging just above the surface 35 of the quench liquid 33 into which they enter and can further cool, e.g., to about 50° C., quickly enough so that their shape does not deform, and solidify or rigidify just below the surface 35. A degree of resistance is imparted to the flow or free fall of the hot, viscous filaments 42 above the surface 35 by the already quenched, aggregated filaments in the quench bath 33 below its surface, which causes the still deformable filaments entering the quench bath to coil, oscillate, or undulate just above the surface of the bath. This motion establishes irregular or random periodic contact between the still-hot filaments, resulting in spot- or tack-bonding of contiguous surfaces of the filaments at their points of contact or intersection. Consequently, the filaments 42 assume a coiled, looped, sinuous, or undulating configuration and become interengaged as illustrated in FIG. 3, one such filament being shown in FIG. 4. The filaments 42 upon entering the quench liquid 33 and passing adjacent immersed guide roll 39 form an integrated web 43 of lightly spot- or tack-bonded, solidified filaments.

The web 43 can be conveyed and withdrawn from the tank 34 by means of pinch rolls 44a and 44b and wound by roll 45 to form a winding 46 of the web. In this tack- or spot-bonded form, the filaments, though interengaged and lightly bonded, generally can be individually and easily pulled by hand from the web 43 and stretched to uncoil or straighten them in continuous form under such hand-pulling and without attenuation, showing that their tack-bonding is not durable. The web 43 can be unwound from winding 46 and placed in an air-circulating oven or the like to heat the web to an appropriate temperature for a sufficient time, e.g., 120° to 300° C., preferably 140° to 250° C., for 1 to 5 minutes, and then cooled to room temperature (e.g., 20° C.) to cause durable melt-bonding of the contiguous surfaces of the filaments in the web at their points of contact and form a finished, integral, unitary web with high void volume, e.g., 40 to 95 vol. %. The time and temperature for this melt-bonding will be dependent upon selecting the desired polymers for components (a) and (b) of the multicomponent filaments.

Figure 1C:
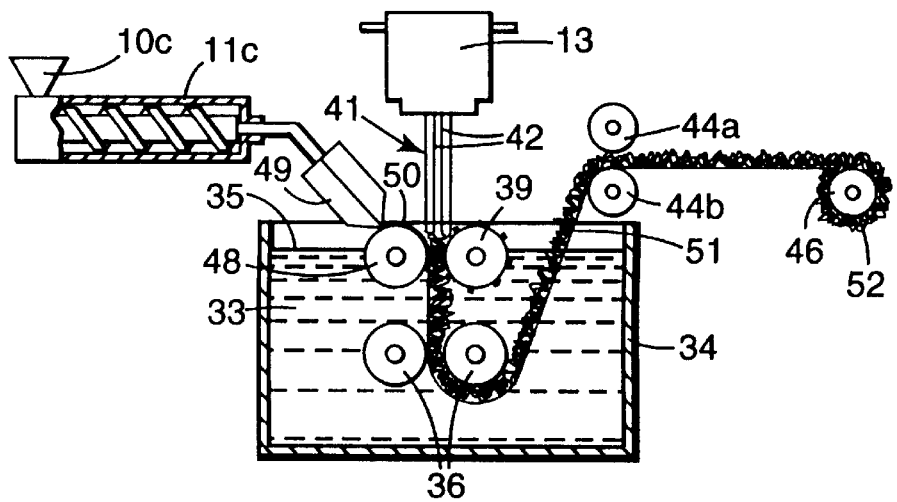
FIGS. 1C and 1D are schematic views in elevation and partial cross-section showing embodiments of apparatus that can be used to make backed, open, nonwoven webs of coiled multicomponent filaments in accordance with this invention.

Referring to FIG. 1C, a web of coiled filaments is fabricated as in FIG. 1B, but the web is laminated with a thermoplastic backing as both are formed. For such lamination a separate extruder 11c, provided with hopper 10c, is used to provide a thermoplastic melt which is supplied to a film die 49 which extrudes a backing film or sheet 50 which can comprise a thermoplastic of the types used to form filament component (b). Such film 50 is directly cast on roll 48 prior to the zone on roll 39 that is also used to form a densified surface of filaments on the web. Some of the downwardly-extruded, hot filaments that comprise the densified portion of the web are laid down on the still hot, cast backing, thereby ensuring good bonding between the backing and the web. The resulting web-backing laminate 51 is conveyed to winder 46 to provide a winding 52 of backed web, which can be placed in a melt-bonding oven to ensure durable melt-bonding.

Figure 1D:
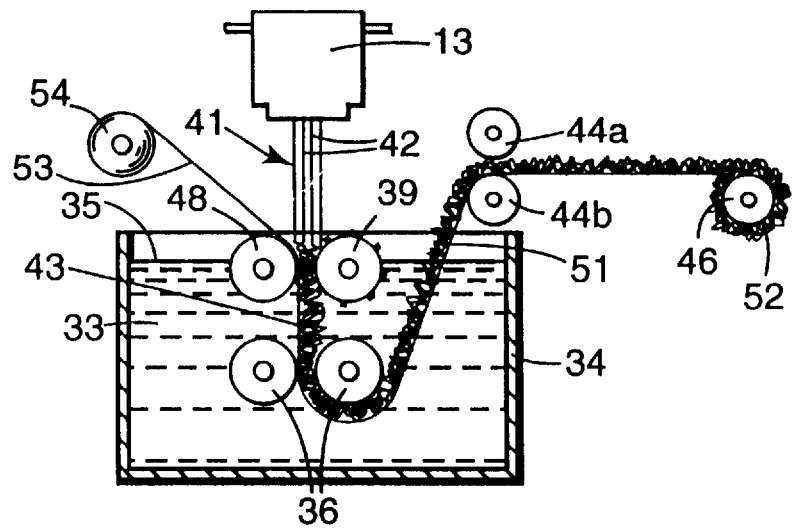

Referring to FIG. 1D, a web of coiled filaments is also fabricated as in FIG. 1B, but an unheated or cool preformed backing 53, which can be thermoplastic of the types used for filament component (b), is supplied by roll 54 and placed in contact by roll 48 with the hot web of filaments and tack-bonded to the surface thereof, the resulting web-backing laminate 51 being conveyed by rolls 44a, 44b and wound by roll 46 to form a winding 52, which can also be melt-bonded in an oven.

FIGS. 5 and 6 illustrate a multicomponent, five-layer filament extrusion die version of extrusion die assembly 13 of FIGS. 1A and 1B, the die pack 90 of this version comprising top plate 18, center distribution plate 96, and lower or orifice plate 97 from which issue hot, viscous, tacky, five-layer filaments formed in the pack. One such filament, with side-by-side alternate layers, is depicted in FIG. 15 and as having three layers 67 of component (b) separated by two layers 66 of component (a). Viscous polymer composition, used to form layers 67 of the filament of FIG. 15, is caused to flow from feed passage 22a to feed manifold 22b to a chamber 94 in top plate 18 that functions as a local manifold from which the polymer melt flows into an array of vertical flow passages 101 each disposed outwards from a central channel 103 in center plate 96. Viscous polymer composition, used to form layers 66 of the filaments, is simultaneously caused to flow from feed passage 24a to feed manifold 24b to a chamber 93 in top plate 18 that functions as a local manifold from which the polymer melt flows into an array of vertical flow passages 102 disposed outwards from a central channel 104 in center plate 96. Channels 103 and 104 axially align with chambers 94 and 93, respectively. Lower plate 97 has an array of circular, vertical channels 99 that is axially aligned with the center of a set of interposed arrays of vertical flow passages 101 and vertical flow passages 102. Channels 99 communicate with the set of arrays of vertical flow passages 101 and 102 and terminate at their lower ends with extrusion nozzles having orifices 100. The upper face of orifice plate 97 is machined with rectangular countersunk depressions 98, each surrounding the upper or inlet end of a channel 99 and defining a cavity between its upper surface and the lower face of distribution plate 96. The component melt streams that will form layers 66 and 67 of the filament shown in cross section in FIG. 15 flow through the passages 102 and 101, respectively, of plate 96, entering the cavity in plate 97, merging to form a single melt stream of five alternating layers and entering channel 99 so that five-layer, multicomponent filaments issue from orifices 100.

In general, the bulk density (or void volume), width, thickness, and loftiness of the webs made from filaments of this invention can be varied by selecting the desired polymers and combinations thereof for forming the multicomponent filaments, the configuration or geometry and dimensions of the extrusion die pack (and the number, size, and spacing of the orifices thereof), and the speed of the various rolls used to convey the web in the quench tank and to wind up the finished web.

Figure 7:
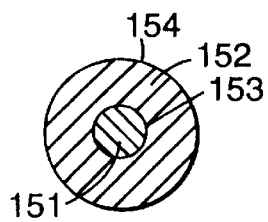
FIGS. 7 to 14 are schematic cross-sections of sheath-core multicomponent filaments of this invention.
Figure 8:
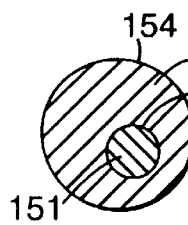
Figure 9:
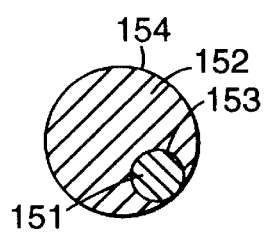
Figure 14:
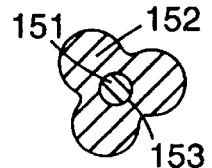

Referring again to the accompanying drawing, FIGS. 7, 8, 9, 11, and 14 illustrate the cross sections of round, circular or trilobal, sheath-core filaments of this invention, each with a single core 151 and a single sheath 152 with a single interface 153 between them. In FIG. 7, the core 151 and sheath 152 are concentric. In FIG. 8, the core 151 is eccentrically disposed within the sheath 152. In both FIGS. 7 and 8, the material-air boundary or peripheral surface 154 of the filaments is defined by the exposed surface of the sheath 152. In FIG. 9, the material-air boundary 154 of the filament is defined in part by the peripheral surface of the sheath 152 and in part by an exposed portion of the core 151 (if that exposed portion were larger, the filament might be more properly called a side-by-side filament). In FIG. 14, the core component 151 is essentially centrally disposed within a trilobal sheath 152.

Figure 10:
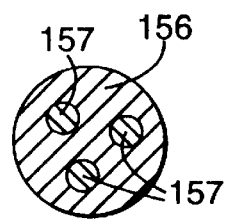
Figure 11:
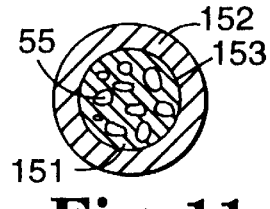
Figure 12:
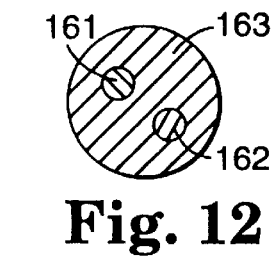
Figure 13:
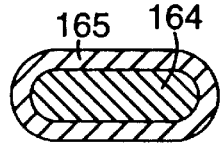

FIG. 11 shows a core 151 which is foamed or cellular, reference number 55 designating one of the many closed cell dispersed therein. FIG. 10 illustrates another embodiment of a sheath-core filament of this invention where the sheath 156 surrounds or provides a matrix for a plurality of spaced-apart parallel cores 157 of the higher-melting filament component (a). In FIG. 12, two, spaced-apart, parallel cores 161, 162 of dissimilar plastic components (a) are disposed within the sheath 163. FIG. 13 shows a filament having central core 164 and sheath 165 with generally rectangular or elliptical cross-sections.

FIGS. 15, 16, and 17 illustrate various embodiments of side-by-side multicomponent filaments of this invention. In FIG. 15, layers 66 of the higher melting plastic component (a) and layers 67 of the lower melting plastic component (b) are alternately disposed in the filament. FIG. 16 illustrates a side-by-side bicomponent filament composed of the higher melting component 70 and lower melting component 71. In FIG. 17, the bicomponent filament is generally rectangular in cross section and composed of a stripe or ribbon 68 of the higher melting plastic component (a) and a contiguous strip 69 of the lower melting plastic component (b).

Figure 18:
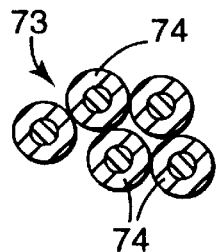
FIG. 18 is a schematic cross-section of a bundle of unbonded, contiguous, sheath-core filaments of this invention.
Figure 19:
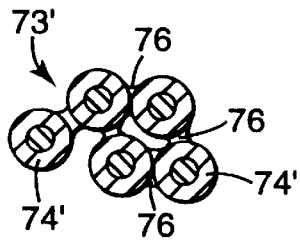
FIG. 19 is a schematic cross-section showing the bonding of the filaments of FIG. 18.
Figure 20:
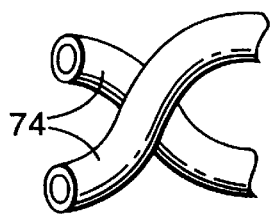
FIG. 20 is a schematic perspective view of portions of two unbonded contiguous sheath-core filaments of this invention.
Figure 21:
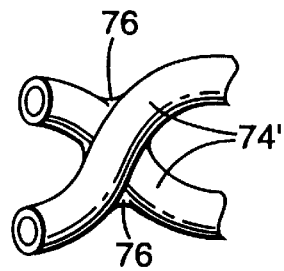
FIG. 21 is a schematic perspective view showing the bonding of the filaments of FIG. 20 at their points of contact.

FIG. 18 illustrates a bundle or aggregation 73 of bicomponent sheath-core filaments 74 (such as those shown in FIG. 7). FIG. 19 shows how the corresponding bundle of FIG. 18 looks upon melt-bonding, namely, bundle 73' which is made up of sheath-core filaments 74' in the bonded form, there being fillets 76 of the lower-melting sheath component formed at the points of contact. Similarly, FIG. 20 shows the exterior of the unbonded contiguous filaments 74 and FIG. 21 shows the exterior of the corresponding bonded filaments 74' with the fillets 76 formed at the points of contact thereof.

Figure 22:
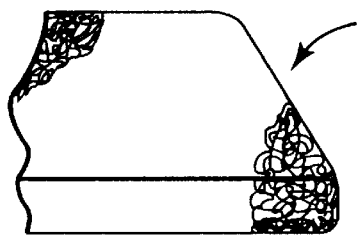
FIG. 22 is a schematic view in perspective of a portion of a filamentary matting of this invention.

FIG. 22 illustrates a mat 77 of this invention that can be cut from the finished webbing 43 of FIG. 1B.

Figure 23:
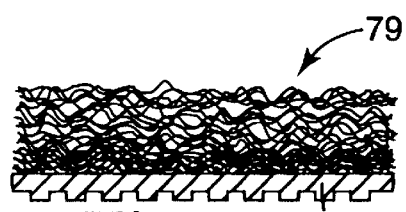
FIG. 23 is a schematic cross-section in elevation of a portion of a filamentary matting of this invention which is bonded to a backing.

FIG. 23 illustrates how the mat of FIG. 22 can be bonded on its lower surface to a backing 78 to form a backed or supported mat 79. The backing 78 can be a thermoplastic material which can be pre-embossed on its lower surface with a pattern, such as that shown, for example, to impart slip resistance to the mat 79.

Figure 24:
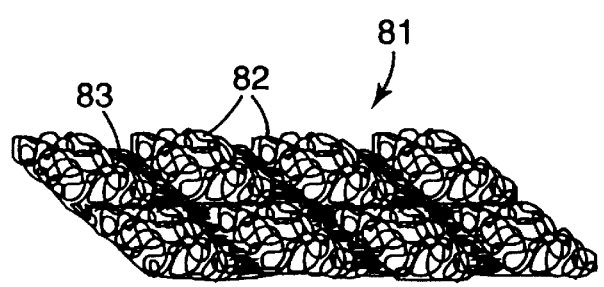
FIG. 24 is a schematic isometric view of a portion of a matting of this invention which is embossed on one side with a grid of channels.

FIG. 24 illustrates how the mat of FIG. 22 can be embossed on one surface to form an embossed mat 81 having raised portions 82 and recessed or depressed portions or channels 83, the dimensions of which raised and recessed portions can vary.

Figure 25:
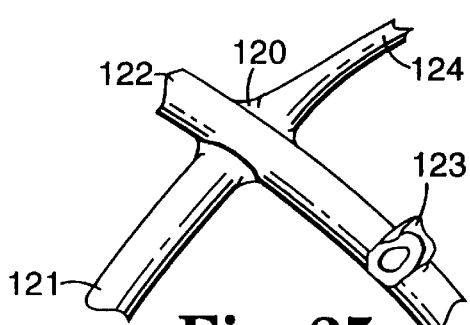
FIG. 25 is a schematic isometric view of a portion of bonded filaments of this invention showing a broken filament and the residue of a broken melt-bond.

FIG. 25 illustrates the toughness of the multicomponent filaments of this invention and the durable melt-bond obtained when an aggregation of the filaments are melt-bonded. In FIG. 25, a representative portion of such an aggregation of filaments are shown after they were melt-bonded and subjected to a pulling stress. Upon exerting such stress, some of the melt-bonds remained intact, as depicted by intact melt bond 120 between intersecting filaments 121 and 122, while other melt bonds broke, as depicted by the remnant 123 of a broken melt-bond, and some of the filaments broke, one of which, depicted as 124, attenuated before it broke.

Figure 26:
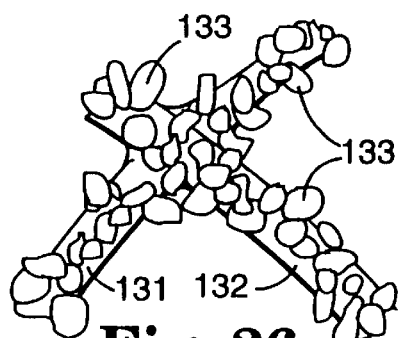
FIG. 26 is an isometric view of abrasive-coated filaments of this invention.

FIG. 26 illustrates two of the multicomponent filaments 131, 132 of this invention which can be covered or coated with abrasive mineral particulate or grains 133 bonded to the thermoplastic component (b) defining the surface of the filaments. An aggregation or web of such abrasive-coated filaments can be used as an abrasive pad or tool.

Thermoplastics (including blends of two or more thermoplastics) which can be used to prepare the multicomponent filaments of this invention are melt-extrudable, normally solid, synthetic organic polymers. The particular application of multicomponent filaments of this invention may dictate which melt-extrudable thermoplastics are selected therefor, based on their melting points. In addition to melting point as a selection guide, the desired toughness of a particular filament, and application thereof may also serve as a selection guide. Preferably the thermoplastic precursors can be melt-extruded into filaments that, when cooled and solidified, are tough in their undrawn state and do not embrittle upon subsequent thermal steps, such as melt-bonding, embossing, and backing. The level or degree of adhesion between the two components of the multicomponent filament at their interface (interfacial adhesion) is important to consider when selecting the type of polymer(s) for the sheath or core. While good interfacial adhesion is not necessary to achieve a tough, macrodenier, multicomponent filament, such adhesion may be desirable for abrasion resistance and toughness.

We have found that not all thermoplastics will be useful in making the tough multicomponent filaments of this invention. Specifically, common thermoplastics used to make drawn, bicomponent, textile fibers may not produce tough, macrodenier, multicomponent filaments in their undrawn state. For example, some polyethylene terephthalates and some polypropylenes, said to be useful in making drawn bicomponent binder fibers, have been found by us to produce undrawn, macrodenier, bicomponent fibers which are brittle and weak, thereby exhibiting poor flexibility and toughness.

Thermoplastics which can be used to prepare the multicomponent macrofilaments of this invention are preferably melt-extrudable above 38° C. and generally are filament-forming. The thermoplastics useful for component (b) must melt at a temperature lower than the melting point of component (a) (e.g. at least 15° C. lower). Furthermore, the thermoplastics for both components (a) and (b) are preferably those which have a tensile strength of 3.4 MPa or greater and elongation to break of 100% or greater, as measured by ASTM D882-90. Each of such thermoplastics is tough, preferably having a work of rupture, as defined by Morton and Hearle in *Physical Properties of Textile Fibers,* 1962, of $1.9 \times 10^7$ J/m$^3$ or greater, as measured from the area under the stress-strain curve generated according to ASTM D882-90 for both components (a) and (b). Additionally, both components preferably have flex-fatigue resistance, or folding endurance, greater than 200 cycles to break, as measured according to ASTM D2176-63T, before and after heat aging or any melt-bonding step. The flex-fatigue resistance can be performed on a 15 mm×140 mm strip of film of the thermoplastic, as outlined in *Instruction Booklet No. 64-10,* Tinius Olsen Testing Machine Co., Easton Road, Willow Grove, Pa. As mentioned earlier, the filaments of this invention are durably melt-bondable. A simple test of the melt-bondability of the filaments, herein referred to as Filament Network Melt-Bond Strength Test, has been devised to measure such melt-bondability and is described below.

The Filament Network Melt-Bond Strength Test Employs a filament-supporting jig in the form of a 3 inch×4 inch×⅜ in (7.7 cm×10.2 cm×1 cm) rectangular block of aluminum, having a central rectangular opening extending from one face to the other and measuring 1¼ inch×2¼ inch (3.2 cm×5.7 cm). Eight straight grooves of equal length are cut in the top face of the block and extending from the central opening to the edges of the block to support a network to be formed by two sets of intersecting identical specimens or segments of a filament whose melt-bonded strength is to be measured and compared with that of the filament itself One set of the grooves consists of a pair of parallel, longitudinally-cut grooves, ½ inch (1.2 cm) apart and deep enough to accommodate the width or diameter of the filament specimen placed therein and extending across the block from one edge thereof to the opening and in alignment with a second pair of line grooves extending from the opening to the opposing edge of the block. The other set of the grooves consist of two similar pairs of grooves, ¾ inch (1.5 cm) apart, extending transversely across the block from one edge to the opposing edge. The specimens of the filament to be melt-bonded are cut long enough to be laid into and extend beyond the grooves and each is pulled taut to remove slack (and without drawing) to form a network or grid (in the form of a "tic-tac-toe" figure) and maintained in that position with pieces of pressure-sensitive adhesive tape, e.g., masking tape, 1 inch (2.54 cm) wide. The filament-jig assembly is placed in a circulating-air oven and heated sufficiently to cause melt-bonds to form, one bond at each of the four points of intersection (over the central opening) of the specimens of filaments. The assembly is removed from the oven and allowed to stand at room temperature to cool and solidify the melt-bonds. The masking tape is then removed and the strength of the melt-bonds in the bonded filament network is then determined by using a Chatillon force gauge, type 719, and a stiff, round rod, such as a ¼ inch (0.5 cm) diameter pencil or wood dowel. The hook of the gauge is placed so as to grasp a first specimen at its center between the two melt bonds that bond it to two other specimens and permit the gauge to be pulled longitudinally by hand away from the network. The rod is placed vertically within the rectangle formed in the network and held against a second specimen opposite the first specimen and centrally between the two melt bonds that bond the second specimen to said two other specimens. With the gauge hook and rod so-positioned, the gage is pulled until a melt bond or a network filament breaks, and the gauge reading is noted at the time of such break. This test is repeated 1–5 times with other specimens of the same filament and the gauge readings at break are recorded together with the nature of the breaks (i.e., melt-bond break or filament break). The average force is calculated. A durably melt-bonded filament has, as mentioned, a melt-bond whose breaking force exceeds 1.4 MPa, based on the cross-section area of the filament before breaking stress is applied.

Preferred properties of thermoplastic polymers useful as components of tough, undrawn, macrodenier, multicomponent filaments of this invention, e.g., sheath-core bicomponent filaments, are set forth in Table 1, together with test methods for determining such properties.

TABLE 1

| Material Property | Component (a) | Component (b) |
|---|---|---|
| Melting Point, °C. (ASTM D2117) | at least 15° C. greater than melting point of Component (b) | >38° C. |
| Tensile Strength, MPa (ASTM D882-90) | ≧3.4 | ≧3.4 |

TABLE 1-continued

| Material Property | Component (a) | Component (b) |
|---|---|---|
| Elongation, % (ASTM D882-90) | ≧100 | ≧100 |
| Work of Rupture, J/m$^3$ (Morton and Hearle, loc. cit.) | ≧1.9 × 10 | ≧1.9 × 10$^7$ |
| Flex Fatigue Resistance, Cycles to Break (ASTM D2176-63T, modified to flex under 2.46 MPa constant stress) | >200 | >200 |

Melting temperature or point (the temperature that a material turns from a solid to a liquid), tensile strength at break, and elongation at break for the thermoplastics to be used in making the multicomponent filaments of this invention may be found in published information on the thermoplastics, such as vendor literature, polymer handbooks, or material databases. The tensile strength, elongation, toughness (work of rupture), and the flex-fatigue resistance of such thermoplastic can be determined on pressed, molded, or extruded film or sheet that has not been drawn and which has been heat aged at the desired melt-bonding temperature and time to be used in melt-bonding the filaments.

Examples of thermoplastic polymers which can be used to form components (a) and (b) of the macrofilaments of this invention include polymers selected from the following classes, which preferably meet the criteria set forth in Table 1: polyolefins, such as polyethylenes, polypropylenes, polybutylenes, blends of two or more of such polyolefins, and copolyiners of ethylene and/or propylene with one another and/or with small amounts of copolymerizable, higher, alpha olefins, such as pentene, methylpentene, hexene, or octene; halogenated polyolefins, such as chlorinated polyethylene, poly(vinylidene fluoride), poly(vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylene adipamide), e.g., nylon 6 and nylon 6,6; nylon elastomers; such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth)acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid- grafted homo- or co-polymers of olefins and blends of two or more of such polymers, such as blends of polyethylene and poly(methyl acrylate), blends of ethylene-vinyl acetate copolymer and ethylene-methyl acrylate; and blends of polyethylene and/or polypropylene with poly(vinyl acetate). The foregoing polymers are normally solid, generally high molecular weight, and melt-extrudable such that they can be heated to form molten viscous liquids which can be pumped as streams to the extrusion die assembly and readily extruded therefrom under pressure as the multicomponent filaments of this invention. The same thermoplastic substance can serve as component (b), e.g., a sheath, in one embodiment of the filaments and as component (a), e.g., a core, in another embodiment of the filaments.

Examples of some commercially-available polymers useful in the practice of this invention are those sold as Elvax™ ethylene-vinyl acetate copolymers, such as Elvax™ 40W, 4320, 250, and 350 products; EMAC™ ethylene-methyl acrylate copolymer, such as EMAC™ DS-1274, DS-1176, DS-1278-70, SP 2220 and SP2260 products; Vista Flex™ thermoplastic elastomer, such as Vista Flex™ 641 and 671; Primacor™ ethylene-acrylic acid copolymers, such as Primacor™ 3330, 3440, 3460, and 5980 products; Fusabond™ maleic anhydride-g-polyolefin, such as Fusabond™ MB-110D and MZ-203D products; Himont™ ethylene-propylene copolymer, such as Himont™ KS-057, KS-075, and KS-051P products; FINA™ polypropylene, such as FINA™ 3860X product; Escorene™ polypropylene such as Escorene™ 3445; Vestoplast™ 750 ethylene-propylene-butene copolymer; Surlyn™ ionomer, such as Surlyn™ 9970 and 1702 products; Ultramid™ polyamide, such as Ultramid™ B3 nylon 6 and Ultramid™ A3 nylon 6,6 products; Zytel™ polyamide, such as Zytel™ FE3677 nylon 6,6 product; Ritsan™ polyarmide elastomer, such as BMNO P40, BESNO P40 and BESNO P20 nylon 11 products; Pebax™ polyether block polyamide elastomer, such as Pebaxr™ 2533, 3533, 4033, 5562 and 7033 products; Hytrel™ polyester elastomer, such as Hytrel™ 3078, 4056 and 5526 products. The above-described ELVAX, EMAC, Primacor, Rilsan, Pebax, Hytrel and Surlyn products may be used, alone or as blends, as component (b); and the above described Vistaflex, Fusabond, Himont, Escorene, Fina, Ultramid and Zytel products can be used alone or as blends of two or more to form component (a). Exemplary combinations of these polymers are set forth in Table 2.

TABLE 2

| Combination | Component (b) | Component (a) |
|---|---|---|
| I | 75 wt % ELVAX 350 25 wt % EMAC SP 2220 | Ultramid 133 |
| II | 75 wt % ELVAX 350 25 wt % EMAC SP 2220 | Himont KS-075 |
| III | 75 wt % ELVAX 350 25 wt % EMAC SP 2220 | 40 wt % Vestoplast 750 60 wt % Escorene 3445 |
| IV | BMNO P40 | Zytel FE 3677 |
| V | Hytrel 5526 | Zytel FE 3677 |
| VI | Pebax 3533 | Ultramid A3K |

Blends of two or more polymers to form component (a) or (b) of the filaments of this invention may be used to allow the custom modification of material properties such that the components meet the performance targets required for a particular application.

Some blends (two of which are believed to be novel) of thermoplastic polymers useful in this invention have been found to possess synergistic flex-fatigue resistance. Such blends have one or more property values listed in Table 1 which are surprisingly superior over those corresponding property values of the individual thermoplastic polymers that are in the blends. The blends can be prepared by simple mixing of the thermoplastic polymers in the appropriate ratios. One such blend is a blend of 85 to 15 wt % poly(ethylene-vinyl acetate), such as Elvax™ copolymer, with 15 to 85 wt % poly(ethylene-acrylic acid), such as PRIMACOR™ polymer, which blend is useful to form a sheath of a sheath-core bicomponent fiber of this invention. Such blend exhibits better flex-fatigue resistance than either poly(ethylene vinyl acetate) or poly(ethylene-acrylic acid) per se. Subsequent heat-aging, however, will degrade these flex-fatigue properties, but the heat-aged blend still meets the property values of Table 1. The poly(ethylene-vinyl acetate) component of the blend generally will have a weight average molecular weight, $M_W$, of 50,000 to 220,000 and will have 5 to 45 mol % of its interpolymerized units derived from the vinyl acetate comonomer and the balance of units from ethylene. The poly(ethylene-acrylic acid) component of the blend generally will have a $M_W$ of 50,000 to 400,000 and have 1 to 10 mol % of its interpolymerized units derived from acrylic acid and the balance from ethylene.

Another such novel blend is a blend of 20 to 70 wt % poly(ethylene-propylene-butene) terpolymer having $M_W$ of 40,000 to 150,000 and derived from equally large amounts of butene and propylene and a small amount of ethylene), such as Vestoplast™ 750 polymer, with 80 to 30 wt % isotactic polypropylene, such blend having highly superior flex fatigue properties as compared to Vestoplast 750 or isotactic polypropylene components per se. Surprisingly, heat aging was found to improve the blend's flex-fatigue resistance. Such blends are useful in forming the core of sheath-core filament of this invention.

Another blend that which can be used in making the multicomponent filaments is a blend that contains from 15 to 85 wt % poly(ethylene-vinyl acetate) and 85 to 15 wt % poly(ethylene-methyl acrylate), such as EMAC™ polymer. The poly(ethylene-vinyl acetate) component of this blend can have a molecular weight and composition like that described above. The poly(methyl acrylate) component can have a $M_W$ of 50,000 to 200,000 and 4 to 40 mol % of its interpolymerized units derived from the methyl acrylate comonomer. The blend has superior flex fatigue resistance as compared to poly(ethylene-vinyl acetate) component per se or poly(ethylene-methyl acrylate) component per se. Subsequent heat-aging of the blend further increased flex fatigue resistance above that of the blend prior to heat aging. Such blend is also useful in forming the core of sheath-core filament of this invention.

The above-described synergistic blends also have utility in the form of film, tapes, or tubing, which involve no heat-bonding, and the blends can also be used as heat-bonding film.

The multicomponent filaments of this invention and/or articles incorporating such filaments may be modified by a number of post-extrusion operations to further enhance utility. Some examples of such operations are the following.

Hot Quench Bath Process (For Melt-Bonding).

In the preparation of articles incorporating the macrodenier, multicomponent filaments of this invention, the temperature of the quench bath described above, e.g., in FIGS. 1A and 1B, may be an elevated temperature to permit durable melt-bonding of the filaments, thus eliminating the need for a thermal bonding step after the filaments are withdrawn from the quench bath. Because of the multicomponent nature of the filaments of this invention, the quench medium in this operation can be heated to a temperature above the melting point of component (b) but below that of component (a). If the web of such filaments is maintained at this temperature, the tackiness or flowability of the still hot component (b) of the filaments is retained, while the now essentially-solidified component (a) provides dimensional stability to the filaments, and, as a result, component (b) has time to melt-bond at the initial tack-bonding sites and provide similar if not equal strength to that achieved in a post-quench thermal bonding step that otherwise would be necessary for durable melt bonding. In contrast, single component filaments cannot be heated to these elevated quench temperatures without seriously distorting or destroying their as-quenched, tack-bonded filamentary structure obtained at lower quench temperatures. This operation, wherein the quench medium can both quench and simultaneously permit melt-bonding, does away with the need for additional bondings step(s). The bath medium for this operation can be selected to match the various filament components and their melt temperatures. The medium may be water or other heat-exchange fluids, such as inert silicone oil or inert fluorochemical fluids. The bath for this operation may be heated by a variety of methods, e.g., electrical immersion heaters, steam, or other liquid heat-exchange means. For example, steam heat may be used to heat a water quench bath to a temperature below the boiling point of water but to a temperature hot enough to melt thermoplastics like polyvinylacetate when used for component (b) of the filaments, while nylon 6 may be used for component (a) which will be quenched at these temperatures. The time and temperature that a web of such multicomponent filaments experiences in the elevated-temperature bath will also affect interfilament bond strength. In conveying the web through the elevated-temperature quench medium and any associated rolls and guiding devices, it may be desirable or necessary to support the web continuously through the medium. It may also be advantageous to add a further cooling station to satisfactorily cool the heated web prior to any additional conveying, handling, or processing.

Embossing Webs

Embossing the melt-bonded, open, nonwoven webs of the macrodenier, multicomponent filaments of this invention is another way of providing a change in either the surface appearance of a web article or in the functionality of the article. Embossing the web article can change the physical appearance of the structure, e.g., by adding a recessed grid pattern or message (e.g., "THINK SAFETY") or a flattened edge to a mat. Additionally, articles comprising the filaments can be embossed by passing such an article between patterned or embossing rolls while the article is still hot and soft from the melt-bonding step and before it is completely cooled. Such an embossed article is shown in FIG. 24. This embossing operation may be utilized to reinforce a web of the multicomponent filaments in both the machine direction and cross direction. The multicomponent filament nature of the webs considerably improves the ease by which embossing for a nonwoven filamentary web may be achieved. Embossing a pattern may comprise heating a multicomponent filament web (without undue distortion or collapse of the web) and then imparting the pattern from a suitably-shaped platen under pressure which also functions to cool the hot web. Alternatively, a heated platen can be used to locally soften and compress a cool web without distorting the remaining uncompressed and unheated web. Desired patterns of either a continuous or noncontinuous nature can be embossed readily without the need for an additional and later reheating step and without undesired collapse of the web structure.

In one method of forming such a patterned web, the above-described Hot Quench Bath Process can be utilized in conjunction with a pair of patterned or embossing rolls that are located after web formation so as to pattern the so-formed web while component (b) of the multicomponent filaments thereof is still hot and tacky and while the web is still easily deformable but yet bonded. This method isolates the web-embossing step from the web-formation step where any excessive surface or wave motion of the bath, that could arise from complex patterns of a surface embossing roll interacting with the bath surface interface, would ultimately cause the resulting web to be nonuniform. The embossing rolls may be contained within the quench bath or may even be located outside of the quench bath but impart their patterning while the web is still hot and before it is cooled to ambient conditions. A patterned web may also be formed by embossing bonded web emerging from a hot air-bonding oven (in cases where hot bath-bonding may not be desirable) with an embossing roll, which typically will be chilled Because of the multicomponent filament nature of the web, web temperatures higher than the collapse temperature of component (b) of the filaments can be achieved so that embossing with excellent flow characteristics can be accomplished without undesired web collapse or distortion. This process patterning would be much more difficult if not impossible with monocomponent fibers that require bonding with an additional bonding agent(s) and web collapse would be a limiting factor.

Foaming Multicomponent Filaments

By dispersing a chemical blowing agent, such as azodicarabonamide, sodium bicarbonate, or any other suitable gas-generating or foam-inducing agent, physical or chemical, to a composition used to form a component of the macrodenier, multicomponent filaments of this invention, a foamed or cellular structure can be imparted to some or all of the components of the filaments. Such foaming may be used to alter the material properties (e.g., resiliency, specific gravity, adsorption characteristics, antislip properties, etc.) of the articles made from the foamed or cellular multicomponent filaments. Such foaming may tend to swell the thickness of the individual filaments as well as the overall thickness of webs formed from these filaments. A surprising and unexpected result of macrodenier, multicomponent filaments of this invention with foamed cores is the superior tensile strength of webs formed from such foamed filaments as compared to web made with unfoamed multicomponent filaments.

Laminating

The macrodenier, multicomponent filaments or webs of this invention may be laminated to one or more preformed elements or backing, such as thermoplastic films or sheets. These elements can be solid or porous (in the case of a foamed film). The backing may act as an impervious barrier to either particulates or fluids as in the case of backed floor mats of open, non-woven webs of the multicomponent filaments, or the backing may act as a reinforcing agent imparting dimensional stability to such mats. The melt-bondable nature of the multicomponent filaments of this invention is particularly useful in achieving their excellent self-bonding to such backings without the need for additional bonding agents. The bonding and laminating temperatures can be sufficient to cause the filaments to become hot and tacky to allow fusion between the backing and filaments while component (a) thereof is above the melt-bonding temperature. Although not restricted to like materials, better bonding can be achieved between similar materials, that is, when the laminating backing is of the same thermoplastic composition as component (b) of the multicomponent filament of this invention. Additionally, the backing may be embossed, prior to lamination, with a secondary pattern, for example, raised pegs or projections, to impart a texture or frictional aspect to the backing or the backing may be embossed as a result of a pattern transferred from a supporting carrier web, for example, a metal grid or mesh, that carries the backing and web through a melt-bonding oven to produce a backed web as described hereinabove and shown in FIG. 23.

The backing may also be thermoformed prior to lamination. The lamination may be carried out by a variety of methods, such as illustrated in FIG. 1C.

In another lamination process, such as shown in FIG. 1D, a cool preformed backing may be used instead of the cast backing illustrated in FIG. 1C, and sufficient tack-bonding can be developed between the cool backing and the web to allow the laminate to be conveyed to the bonding oven where durable melt-bonding can be achieved. Alternatively, the Hot Quench Bath Process described above can be used to durably melt-bond multicomponent filaments of the laminate.

In another lamination process, a preformed thermoplastic backing may be positioned below the web just prior to the melt-bonding oven, whereby the weight of the web in contact with the backing is sufficient to obtain the durable melt-bond of the web-backing, laminate. These laminations can be considered to be ambient lamination without any undesired or added pressures, but these laminations can also be formed using compressive forces to deform hot webs so as to form additional embossing (described hereinbefore) in combination with laminating process.

Abrasive Articles

Abrasive articles can be made using the macrodenier, multicomponent filaments of this invention or webs thereof. These articles can be used for abrasive cutting or shaping, polishing, or cleaning of metals, wood, plastics, and the like. Additionally, coating abrasive particulate or grains on the multicomponent filament surfaces can provide antislip or friction. Current methods of creating an abrasive article as taught in U.S. Pat. No. 4,227,350, for example, typically rely on first coating a suitable substrate with a durable binder resin and, while it is still tacky, then coating thereon abrasive particles or other materials, and finally curing the abrasive or antislip composite structure to achieve durability, toughness, and functionality. Such a process typically requires high performance resin systems that contain solvents and other hazardous chemicals that necessitate additional careful monitoring to ensure adequate cure with minimization of residual ingredients as well as sophisticated pollution control schemes to control harmful solvent emissions. The tough, multicomponent filaments of this invention allow simplification to the overall abrasive- or particle-holding binder systems by elimination of solvent-coating techniques, the ability to use 100% solids systems instead, and elimination even of the need for additional bonding agent in the cases where a prebond resin system must be used prior to any abrasive binder resin system. The multicomponent filaments of this invention can simultaneously provide bonding and "make coat" capability. Materials suitable for the abrasive particulate component can be granules of regular or nonregular shape, of virtually any size, and selected from a broad variety of classes of natural or synthetic, abrasive, mineral particulate, such as silicon carbide, aluminum oxide, cubic boron nitride, ceramic beads or grains such as Cubitron™ abrasive materials, and plastic abrasive grains, as well as agglomerates of one or more of these materials. The ultimate use of the abrasive article will determine what materials are suitable for component (b) of the multicomponent filament of such article.

Different methods of applying or coating the abrasive particulate on or to the filaments or webs of this invention can be used. Because of the multicomponent nature of the filaments of this invention, the higher melting point component (a) thereof allows structural integrity of the filaments while allowing component (b) to retain its hot, tacky nature when the filaments are heated in a melt-bonding oven. By sprinkling, dropping, blowing or otherwise coating the abrasive particulates onto the hot, tacky surface of the filaments, the particulates will adhere to such surface. Depending on the heat capacity, crystallinity, and melting point of component (b), adhesion of room temperature or cool abrasive particulates can occur. Enhanced adhesion can occur when abrasive mineral particulate is preheated prior to dropping onto the hot component (b) surface such that localized cooling is minimized. Adhesion to higher melting point thermoplastics is especially enhanced by preheating the abrasive mineral. In addition, surface treatments of the abrasive particulates may also enhance adhesion, for example, by a silane surface treatment. Another method of coating filaments or webs of this invention is passage of either the filaments or previously prebonded webs thereof into a fluidized bed of heated abrasive mineral particulate. This process has the particular advantage of more forcefully pushing the hot abrasive mineral into heated component (b). After cooling, the abrasive particulates are adhered onto and into component (b). A further size coat of suitable resin, such as a polyurethane or resole phenolic resin, may be used to further lock the abrasive particulate to the surface of the multicomponent filament or webs thereof.

Filamentary Structures

The multicomponent nature of the filaments of this invention may also be advantageously used to enhance bonding when articles or webs in the form of filamentary structures, for example, as generally taught by U.S. Pat. Nos. 4,631,215 (Welygan et al.), 4,634,485, and 4,384,022 (Fowler) are fabricated from both straight and undulating or spiral filaments. Bonding occurs when the undulating or spiraling, hot, extruded, multicomponent filaments contact adjacent straight filaments and then are quenched in a cooling bath to retain the shape of the so-formed filamentary structure. The multicomponent nature of the filaments provides an unexpected advantage by allowing component (a) thereof to provide a structural role in supporting the shape of the web of such filaments in either a postformation melt-bonding step or by utilizing the above-described Hot Quench Bath Process without the need for any additional process steps. In this fashion a tough, durable web of filamentary structure of multicomponent filaments can be prepared.

Fire Retardancy

As mentioned hereinbefore, fire retardant additives may be incorporated or dispersed in the filaments of this invention. Examples of such additives are ammonium polyphosphate, ethylenediamine phosphates, alumina trihydrate, gypsum, red phosphorus, halogenated substances, sodium bicarbonate, and magnesium hydroxide. Such additives can be blended with the particulate thermoplastic precursor of components (a) and/or (b) of the filaments of this invention or can be added to the melts thereof in the melt extruders used to prepare them. Preferably such additives, where used to impart fire retardancy to filaments of this invention, are incorporated only in a component (a) which does not have an external surface that defines the material-air boundary of the filaments such as the core of bicomponent sheath-core filaments. By so-incorporating the fire retardant additive in the core of the filament, the melt-bonding capability of the sheath, component (b), and thus the durability of the resulting melt-bonded structure, remain uncompromised, even if a high amount of the fire retardant additive is used. The particular fire retardant additive used for this purpose and the amount thereof to be incorporated will depend upon the particular filament to be made fire retardant, the particular thermoplastics thereof, and the application to be made of the filament. Generally, the amount of fire retardant additive, such as magnesium hydroxide, will be 10 to 40 wt % or more, based on the total weight of the fire retardant additive and filament or, functionally stated, an amount sufficient to render the filament fire retardant as determined by ASTM D-2859-76.

EXAMPLES

The following examples are meant to be illustrative of this invention and objects and advantages thereof, and should not be construed as limiting the scope of this invention. The measurement values given in these examples are generally average values except where otherwise noted.

Example 1

Extrusion, quenching, and web collection equipment like that of FIG. 1B was used to make open, non-woven web of concentric sheath-core bicomponent filaments like those whose cross-section is shown in FIG. 7. In this example, an amount of 98 parts of Ultramid B3 nylon-6 pellets (previously dried under a nitrogen blanket at 100° C.) were blended with 2 parts nylon pigment pellet concentrate (supplied by Reed Spectrum Co.). The blend was extruded as a stream of viscous core melt through a 38 mm single-screw extruder having a 36/1 L/D ratio (length/diameter) and neck tube into a coextrusion die assembly of the castellation type, like that illustrated in FIGS. 2A, 2B, at a temperature of 280°–290° C. and at a rate of 20.3 kg/hr to form the core of sheath-core bicomponent filaments of this invention. Specifications of the extrusion die assembly are given in Table 3.

TABLE 3

| | |
|---|---|
| Number of rows of die orifices | 5 |
| Orifice row spacing | 4.064 mm |
| Orifice spacing | 6.350 mm |
| Orifice diameter | 0.572 mm |
| Orifice L/D | 4/1 |
| Number of orifices | 75 |
| Castellation diameter | 2.997 mm |
| Castellation width | 0.737 mm |
| Castellation gap | 0.254 mm |
| Vertical channel diameter | 1.524 mm |

Elvax 350 ethylene-vinyl acetate copolymer and EMAC SP2220 ethylene-methyl acrylate copolymer were blended together at a weight ratio of 3/1, respectively. The resulting blend was extruded, simultaneously with the extrusion of the above-described polymer core melt, as a stream of viscous, sheath melt through a 30 mm single-screw extruder having a 30/1 L/D ratio into the same coextrusion extruder die assembly as described above, at a temperature of 230°–240° C. and at a rate of 30.7 kg/hr to form the sheath of the bicomponent filaments.

The resulting bundle of hot, tacky, macrodenier, sheath-core bicomponent filaments continuously extruded from the extrusion die assembly was allowed to fall freely in quiescent ambient air for a distance of about 300 mm before coiling and advancing as a web in a water quench bath (about 25° to 32° C.) containing 0.03 wt % dioctyl-sodium sulfosuccinate surfactant, where the filaments cooled and solidified with the interengaged filaments tack- or spot-bonded together in an open web. The falling filaments made glancing contact on a quench roll partially immersed in the quench bath and thereby differentially quenched in the quench bath, as described in said U.S. Pat. No. 4,351,683. The filaments were advanced through the bath at a take-away speed of 2.1 meters per minute, producing open nonwoven web having a densified layer portion from contact with the quench roll and an opposing nondensified layer portion adjacent the noncontacting side of the bundle. The final diameter of the quenched bicomponent filaments ranged from 0.712 to 0.737 mm with a 60/40 sheath to core ratio by volume. The web of filaments had a weight of 1.8 kg/m$^2$. The web was removed from the bath and air-dried. Filaments were removed from the tack-bonded web and the melt-bondability thereof was determined according to the Filament Network Melt-Bond Strength Test; filament breakage occurred at 8.9N or 22.4 MPa. The filaments in the dried web were made to durably melt-bond at their points of contact by heating the web in a circulating-air oven at 150° to 160° C. for 3 minutes. The melt-bonded web was removed from the oven and allowed to cool to ambient conditions. The resulting open, nonwoven web comprising undrawn, durably melt-bonded, continuous, intermeshed, macrodenier, multicomponent filaments, with a sheath-core volume ratio of 60/40, was 15.3 mm thick and generally resembled the web illustrated in FIG. 22.

Example 2

Using the process described in Example 1 to make concentric sheath-core, macrodenier bicomponent filaments and web thereof, Escorene 3445 polypropylene pellets and Vestoplast 750 terpolymeric olefin pellets were blended together at a weight ratio of 1/1 with 12 wt % magnesium hydroxide flame retardant concentrate (LR 84827, supplied by Ampacet Co.) and 2 wt % olefin pigment concentrate (supplied by Reed Spectrum Co.). The blend was extruded at 230° to 240° C. and at a rate of 27.5 kg/hr to form the core of sheath-core bicomponent filaments of this invention. Elvax 350 ethylene-vinyl acetate copolymer and EMAC SP2220 ethylene-methyl acrylate copolymer were blended together at a weight ratio of 3/1, respectively. The blend was simultaneously extruded at 230° to 240° C. and at a rate of 27.5 kg/hr to form the sheath of the sheath-core bicomponent filaments of this invention. The final diameter of the quenched macrodenier filaments was 0.712 to 0.737 mm and filament breakage occurred at 5.8N or 14.6 MPa.

Using thermal-bonding conditions of Example 1, the resulting open, nonwoven, melt-bonded web comprising undrawn, durable, continuous, intermeshed, macrodenier sheath-core filaments with a sheath to core ratio of 50/50, had a web weight of 2.0 kg/m$^2$, was 15.6 mm thick and generally resembled the web illustrated in FIG. 22.

A sample of the web was found to be fire retardant when subjected to the flame retardancy test of ASTM D-2859-76, which corresponds to the Flammability Test of the U.S. Dept. of Commerce, DOC FF 1-70.

Example 3

Using the process described in Example 1 to make concentric sheath-core, macrodenier bicomponent filaments and web thereof, Himont KS-075 ethylene-propylene graft copolymer pellets were blended with 12 wt % magnesium hydroxide flame retardant concentrate (LR 84827 from Ampacet Co.) and 2 wt % olefin pigment concentrate (from Reed Spectrum Co.). The resulting blend was extruded at a rate of 27.5 kg/hr to form the core of the sheath-core bicomponent filaments of this invention. Elvax 350 ethylene-vinyl acetate copolymer and EMAC SP2220 ethylene-methyl acrylate copolymer were blended together at a weight ratio of 3/1, respectively. The resulting blend was simultaneously extruded at a temperature of 230° to 240° C. and at a rate of 27.5 kg/hr to form the sheath of the sheath-core bicomponent filaments of this invention. The final diameter of the quenched bicomponent filaments was 0.737 to 0.787 mm.

Using thermal bonding conditions of Example 1, the resulting open, durably melt-bonded web, comprising undrawn, continuous, intermeshed, macrodenier filaments with a sheath-to-core weight ratio of 50/50, had a web weight of 2.4 kg/m$^2$, was 16.3 mm thick, and generally resembled the web illustrated in FIG. 22.

Example 4

Using the process described in Example 1 to make concentric sheath-core, macrodenier, bicomponent filaments and web thereof, and sheath and core materials as described in Example 3, a continuous web was made of filaments having diameters of 0.737–0.787 mm (after a free fall of 310 mm) and that were advanced in the quench bath at a take away speed of 2.0 m/min. The water bath temperature was raised to 80° C., at which point melt-bonding of the filaments at their points of contact occurred over the initial spot- or tack-bonding of the web formed at the lower bath temperature. The web was withdrawn from the bath, cooled and air-dried. The resulting open, permanently melt-bonded web comprising undrawn, durable, continuous, intermeshed, macrodenier, sheath-core filaments with a sheath-core volume ratio of 50/50, had a web weight of 2.1 kg/m$^2$, was about 15 mm thick and generally resembled the web illustrated in FIG. 22.

Surprisingly no further heat treatment of the web was needed to produce a durably melt-bonded web equivalent to the web subject to the oven bonding process, as shown in Table 4.

TABLE 4

| | Web Tensile Strength, N/cm | |
|---|---|---|
| Condition | Cross Tensile | Length Tensile |
| Water Temp. = 34° C. (no oven bonding) | 18.3 | 4.6 |
| Water Temp. = 80° C. | 90.4 | 70.7 |
| Water Temp. = 34° C. (oven bonded 3 min at 150° C.) | 67.1 | 44.1 |

In another run, using the process described in Example 1 to make concentric sheath-core, macrodenier, bicomponent filaments and web thereof, Zytel FE3677 nylon 6,6 pellets (previously dried under a nitrogen blanket at 100° C.) were extruded at 280° to 290° C. and at a rate of 19.3 kg/hr to form the core of the sheath-core bicomponent filaments of this invention. Rilsan BMNO P40 nylon 11 pellets were extruded at a temperature of 230° to 240° C. and at a rate of 23.7 kg/hr to form the sheath of the sheath-core bicomponent filaments of this invention. Continuous webs having filament diameters of 0.406 to 0.440 mm after free falling 310 mm and a web weight of 0.98 kg/m$^2$ were made. After water quenching and air drying, this spot- or tack-bonded web was conveyed into another quench bath containing a high temperature silicone fluid (Product #17,563-B of the Aldrich Chem. Co., CAS No. 63148-58-3) heated to 180° C. The web was held for 2 min in the bath to cause durable melt-bonding of the filaments to take place.

Example 5

Webs made as described in Examples 1, 2, and 3 were heated in a circulating-air oven at 160° C. for 3 min, removed from the circulating air oven, and, while still hot, the web was laid on a cool, flat surface, and was embossed on its top surface with a checkboard pattern using an embossing plate having a raised pattern that allowed compression or embossing of selected areas of the hot web while having sufficient clearance so as not to distort or compress the remaining areas of the web. The embossing plate was applied to the top surface of the web with a force of about 1 kg/cm$^2$. The duration of embossing was 30 seconds. Upon air-cooling of the hot web, the resulting embossed pattern was permanent and consisted of undeformed web of durably melt-bonded filaments and having squares about 2 by 4 cm separated by compressed or embossed channels having a width of 1 cm. The embossed webs are illustrated in FIG. 24.

Example 6

Web made in an 80° C. temperature quench bath as described in Example 4 was passed between the nip of a rotating embossing roll (replacing roll 44a of FIG. 1B) at 2 m/min and a smooth backup roll (designated 44b of FIG. 1B). The web still being hot was thereby embossed on its top with a checkboard pattern as in Example 5.

Example 7

An open, durably melt-bonded web comprising undrawn, durable, continuous, intermeshed, macrodenier filaments with a sheath-core ratio of 50/50, having a web weight of 2.1 kg/M$^2$, and thickness of 16.3 mm, made as described in Example 3, was placed on a silicone rubber-covered buffer cloth. The layered combination was put onto the platen surface of a 6 KW Thermatron™ radio frequency (RF) press. A 9.5 mm thick magnesium etched-plate having a design comprised of the raised lettering "3M," about 6.1 mm high and having a surface area of about 32 cm, was placed on the top surface of the web-cloth combination. The press was closed and pressure applied with an air piston having a diameter of 15.24 cm and pressurized at 0.66 MPa. The RF heating cycle of the press was 10 sec. at 30% power with a cooling cycle (under pressure) of 7 sec. The press was opened and the resulting web had the recessed lettering "3M" clearly embossed on the top surface of the web without any undue distortion of the portion web surrounding the lettering.

Example 8

Using the process described in Example 1 to make concentric sheath-core, macrodenier bicomponent filaments and web thereof, Ultramid B3 nylon 6 pellets (previously dried under a nitrogen blanket at 100° C.) were extruded at 280°–290° C. and at a rate of 3.4 kg/hr to form the core of the sheath-core bicomponent macrodenier filaments of this invention. Elvax 350 ethylene-vinyl acetate copolymer and EMAC SP2220 ethylene-methyl acrylate copolymer were blended together at a weight ratio of 3/1, respectively; the blend was simultaneously extruded at 230° to 240° C. and at a rate of 15.9 kg/hr to form the sheath of the sheath-core bicomponent filaments of this invention. Continuous webs having filament diameters of 0.712 to 0.747 mm after free-falling 300 mm and a web weight of about 0.75 kg/M$^2$ were made of the sheath-core filaments. Instead of forming a single core within the sheath, a different distribution plate (item 18 of FIG. 2B) was used having three orifices (each 3.81 mm in diameter) arranged in a triangular pattern with the orifices at the apices of an equilateral triangle but yet located within the flow boundary of the vertical channel (item 27 of FIG. 2B). The centerline of each orifice was 4.572 mm from the centerline of the vertical channel. The core melt was directed to said orifices to allow three core components to be formed within the sheath component of each macrodenier filament. The cross-section of such a fiber is illustrated in FIG. 10.

Example 9

A batch of Himont KS-075 ethylene-propylene graft copolymer pellets were extruded through a 38 mm extruder having a 36/1 L/D ratio and a neck tube into a coextrusion die assembly having slot-shaped, major and minor extrusion die orifices capable of forming a filamentary structure consisting of bicomponent sheath-core filaments, rectangular in cross section. The structure was otherwise in the form of a central regularly undulated filament extruded via the major slots and surrounded and bonded to a plurality of straight, parallel, spaced, filaments, extruded via the minor slots and forming a cage for the undulated filament, as described in U.S. Pat. No. 4,631,215 and shown in FIG. 7 thereof, which description is incorporated herein by reference. The extrusion was carried out at a temperature of 230°–240° C. and at a rate of 18.2 kg/hr. Specifications of the extrusion die assembly similar to that used in Example 1 are given in Table 5.

TABLE 5

| | |
|---|---|
| Major slot width | 2.591 mm |
| Major slot height | 7.874 mm |
| Minor slot width | 1.803 mm |
| Minor slot height | 8.636 mm |
| Slot spacing | 7.163 mm |
| Number of major slots | 6 |
| Number of minor slots | 7 |
| Castellation width | 0.61 mm |

Elvax 350 ethylene-vinyl acetate copolymer and EMAC SP2220 ethylene-methyl acrylate copolymer were blended together at a weight ratio of 3/1, respectively. The blend was extruded at 230° to 240° C. and at a rate of 32.6 kg/hr to form the sheath of the sheath-core bicomponent filaments of this invention. The as-extruded filamentary structure consisting of melt-extruded, bicomponent, undulated and straight filaments from the extruder die assembly was allowed to fall freely therefrom for a distance of 108 mm before entering into the water quench bath where they were quenched as described in U.S. Pat. No. 4,631,215. The finished web weighed about 3.8 kg/m$^2$.

Example 10

Multilayer side-by-side filaments having a cross-section like that illustrated in FIG. 15, were prepared by melt-extruding two different thermoplastics, designated "A" and "B" for clarity in description, in five alternating layers, that is, ABABA, using extrusion, quenching, and web collection equipment like that illustrated in FIG. 1A. To form the "A" layers, Surlyn 1702 ionomer resin was extruded through a 38 mm single-screw extruder having a 36/1 L/D ratio and neck tube into the die assembly at a temperature of 285°–290° C. and a rate of 9.1 kg/hr. To form the "B" layers, Elvax 250 ethylene-vinyl acetate copolymer was extruded through a 30 mm single-screw extruder having a 30/1 L/D ratio into the coextrusion die assembly at a temperature of 205°–275° C. and at a rate of 7.7 kg/hr. Details of the coextrusion die assembly to form these multilayer filaments are given in Table 6.

TABLE 6

| Number of rows of die orifices | 4 |
|---|---|
| Orifice row spacing | 5.715 mm |
| Orifice spacing | 3.175 mm |
| Orifice diameter | 0.889 mm |
| Orifice L/D | 5 |
| Number of orifices | 120 |
| Vertical channel diameter | 1.080 mm |
| Vertical flow passageway width | 0.381 mm |
| Vertical flow passageway spacing | 6.350 mm |
| Orifice cavity entrance width | 1.080 mm |
| Orifice cavity entrance length | 4.445 mm |

Continuous webs comprised of these quenched five-layer filaments were thus made having filament diameters of 0.432 to 0.508 mm after free falling 300 mm and a web weight of 1.27 kg/m². The filaments were differentially quenched in the bath, which contained 0.03 wt % dioctyl sodium sulfosuccinate surfactant, at a takeaway speed of 2.1 meters per minute. The resulting open, nonwoven web of coiled five-layered macrodenier filaments had a densified surface from contact with the quench roll and an opposing undensified surface on the noncontacting side of the filament bundle.

Example 11

The process described in Example 1 was used to make four open, nonwoven webs of concentric sheath-core, macrodenier bicomponent filaments with the same sheaths but with the cores being different for each web. For these webs, Escorene 3445 polypropylene pellets and Vestoplast 750 terpolymeric olefin pellets were first blended together at a weight ratio of 1/1 with 12 wt % magnesium hydroxide flame retardant concentrate (LR 84827 supplied by Ampacet Co.). Four separate core precursor batches using this preblend were then prepared by adding to three of the batches a chemical blowing agent, Kempore™ 125 (an azodicarbonamide supplied by Uniroyal Chemical Co.), the quantity of the chemical blowing agent used in each batch being different. The blends were extruded in separate batches at 230° to 240° C. and at a rate of 27.5 kg/hr to form the core of sheath-core bicomponent filaments of this invention. For the sheath, Elvax 350 ethylene-vinyl acetate copolymer and EMAC SP2220 ethylene-methyl acrylate copolymer were blended together at a weight ratio of 3/1, respectively. The resulting blend was simultaneously extruded with each of the separate core precursor batches described above at a temperature of 230° to 240° C. and at a rate of 28.4 kg/hr to form the sheath of the sheath-core bicomponent filaments of this invention. The hot, tacky, melt-extruded, sheath-core filaments were allowed to fall freely in quiescent air for a distance of about 290 mm before coiling and advancing in the water quench bath as a web. The filaments were differentially quenched in the bath (which contained 0.03 wt % dioctyl sodium sulfosuccinate surfactant) at a take-away speed of 2.4 meters per min. The resulting open, nonwoven web of coiled, continuous filaments had a densified surface from contact with the quench roll and an opposed nondensified surface from the noncontacting side of the bundle of filaments. A cross section of the sheath-core filaments under a microscope revealed a cellular structure as depicted in FIG. 11 with the cellular content varying with the amount of chemical blowing agent. The tensile strength of the quenched web containing chemical blowing agent was unexpectedly stronger than that of the web which contained no chemical blowing agent even though the thickness and weight of the webs remained relatively constant. The final diameter of the quenched bicomponent filaments, web thickness, and tensile data with the amount of chemical blowing agent present are detailed in Table 7.

The tensile strength of the various webs were measured using an Instron tensionmeter with a crosshead speed of 50.8 cm/min. Sample size was 5 cm across by 18 cm. Tensiometer jaw spacing was 5 cm. The webs were not heat bonded. The results of such measurements, set forth in Table 7, surprisingly show that the use of a blowing agent significantly increased the strength of the tack-bonded web as compared to web made from bicomponent filaments that did not contain blowing agent.

TABLE 7

| Web No. | Amount of foaming agent (wt %) | Web Weight (kg/m²) | Web Thickness (mm) | Filament Diameter (mm) | Cross Tensile, (N/cm) | Length Tensile, (N/cm) |
|---|---|---|---|---|---|---|
| 1 | 0 | 2.51 | 21.3 | .711 | 30.1 | 10.5 |
| 2 | 0.1 | 2.43 | 19.2 | .787 | 52.9 | 20.5 |
| 3 | 0.2 | 2.56 | 22.0 | .787 | 60.2 | 27.8 |
| 4 | 0.4 | 2.57 | 22.6 | 1.041 | 74.1 | 42.9 |

Example 12

Web made as described in Example 2 but not heat bonded was separated into helical strands, chopped using a guillotine cutter into 25–38 mm staple, sheathments, core filaments, and the staple was air-dropped onto a tray of Teflon™ plastic to produce a random three-dimensional array of the staple filaments. The array of staple filaments was heated in a circulating-air oven at 150° C. for 3 min. to durably melt-bond the staple at points of contact and produce a tough, open, nonwoven web of the bonded staple filaments.

Example 13

Web made as described in Example 1 and as illustrated in FIG. 22 was placed onto a tray of Teflon™ polymer and heated in a circulating-air oven at 150° C. for 3 min. Immediately after removal from the oven, 80 grit particulate aluminum oxide mineral was dropped onto the hot, tacky, top surface of the web until it was essentially covered. The coated web was cooled to produce a bonded abrasive web of the sheath-core filaments. Similarly, Polyhard Type III plastic (30–40 mesh) abrasive blasting media was applied to the surface of the above web of bicomponent sheath-core filaments.

Using the process described in Example 1 to make concentric sheath-core bicomponent filaments and web thereof, Zytel FE3677 nylon 6,6 pellets (previously dried under a nitrogen blanket at 100° C.) were extruded at 304–310° C. and at a rate of 11.4 kg/hr to form the core of the sheath-core bicomponent filaments of this invention. Rilsan BMNO™ P40 nylon 11 pellets were extruded at a temperature of 218° to 240° C. and at a rate of 20.7 kg/hr to form the sheath of the sheath-core bicomponent filaments of this invention. The filament bundle was allowed to fall freely for a distance of 250 mm before coiling and advancing into the water quench bath. The filaments were quenched in a water quench bath at a take-away speed of approximately 5.3 meters per minute producing a non-woven web having a slightly densified surfaces from contact with the quench rolls and a resulting web weight of 0.98 kg/m² and web thickness of 22–24 mm. The final diameters of the quenched filaments were 0.48–0.5 1 mm. The web was heated in a circulating-air oven for 3 min. at 215° C. Silicon carbide abrasive mineral (80 grit) was also heated in an aluminum pan at 215° C. in the same oven for 3 minutes and sprinkled onto the still hot web. The mineral-coated web was allowed to cool upon removal from the oven. The mineral was sufficiently adhered to the web to allow moderate handling without dislodging the mineral. A polyurethane size-coat comprising Adiprene™ BL-35 (67.69 wt % polyurethane prepolymer, mixed with a 35% solution of methylenediamine in 2-etboxyethanol acetate) was prepared for subsequent overcoating of the mineral-coated webs. The size-coat mixture was heated slightly to assist in mixing and reduce viscosity. The previously prepared mineral-coated webs were die-cut into 10 cm diameter disks. Two of these disks (having 80-grit mineral) were coated with size and then spun to remove excess coating. The disks were then cured at 150° C. for 20 minutes. The finished disks were attached to a heavy-duty, rotary, air tool, capable of approximately 18,000 rpm, with a self-tightening mandrel. A small amount of topical lubricant was applied to minimize smearing. The disks were tested by abrading a stainless steel strip. Wheel integrity was very good without web breakup or dislodging of the mineral. Abrasion of the stainless steep strip was observed as would be expected of an aggressive abrasive wheel.

Using the same coating procedures as described above, 180 grit silicon carbide abrasive was also applied to the surface of the web of bicomponent sheath-core filaments comprised of Rilsan BMNO™ P40 nylon 11 sheath and Zytel™ FE3677 nylon 6,6 core and tested in the same fashion. Table 8 summarizes the composition of these composite abrasive articles.

TABLE 8

| | Wt., g/154 cm² Web | |
|---|---|---|
| | 80 Grit SiC | 180 Grit SiC |
| Web only | 10.47 | 10.47 |
| Web and mineral coat | 41.22 | 19.65 |
| Web and mineral and size coat | 50.14 | 23.61 |

Example 14

A variety of web or mat composites, Lots D to I, similar to that illustrated in FIG. 23 (but without the embossed pattern on the backing), were prepared from different combinations of webs comprised of macrodenier, sheath-core bicomponent filaments of this invention and certain sheet backings. The sheet backings consisted of either blends of Elvax 350 and EMAC SP2220 or blends of Elvax 260 and Primacor 3460, as detailed in Table 10. In addition, the sheet backing of Lot I was foamed using a chemical blowing agent.

Each of the unfoamed sheet backings was about 0.762 mm in thickness and was prepared by extruding, at a temperature of about 183° C., a mixture of components, as described in Table 10, from a 63.5 mm single-screw extruder, having an L/D ratio of 30/1, through a 508 mm film die into a film falling 75 mm before being contacted by a set of polished, chilled, steel nip rolls. The rolls were chilled to 15° C. and the sheet collected at a line speed of 1.3 meters/min.

The foamed film backing was about 0.5 mm in thickness and was prepared by extruding at a temperature of about 190° C. a mixture of components, as described in Table 10, from a 89 mm single-screw extruder, having an L/D ratio of 36/1 containing a single-flighted, two-stage screw having two dispersive mixing sections, through a static Kenics™ mixer which was 28.5 mm in diameter and 279 mm in length and consisted of nine static elements, and finally through a 1290 mm film die into a film falling about 4 mm before contacting a polished, chilled, steel roll. The 610 mm diameter roll was chilled to 12° C. and the film collected at a line speed of 7.6 meters/min.

In making each of the web or mat composites D, E, F, H, I, the first prepared webs were placed on the top surface of the prepared films, the combinations as described in Table 10, to form a two-layer combination. This combination was then passed through a two-zone, circulating-air oven (7.6 m long) having first zone at a temperature of 155° C. and a second zone at a temperature of 130° C. Each composite was moved through the oven on a carrier belt (a mesh with 6 mm square openings) at a line speed of 3 m/min. The composites were then removed from the circulating-air oven and cooled to ambient conditions. The resulting composites were durably melt-bonded at the web-backing interface and at the contiguous or crossover points of contact of the individual web filaments.

A second sample of composite F was similarly treated but at 165° C. for about 3.5 min. The resulting composite had a pronounced mesh pattern embossed on the lower surface of the backing, providing slip resistance to the composite.

Lamination of the backing sheet to the web of Lot G was also accomplished by feeding the previously formed backing sheet onto the quench roll and, while melt-extruding the bicomponent filaments by the process described in Example 3, allowing the hot and tacky bicomponent macrodenier filaments to differentially quench against the sheet. Surprisingly the resulting web was durably melt-bonded to the backing, resulting in a tough, durable backed mat.

TABLE 10

| | Amounts of Ingredients, wt % Lot | | | | | |
|---|---|---|---|---|---|---|
| Ingredients | D | E | F | G | H | I |
| Sheath | | | | | | |
| Elvax 350 | 73.5 | 73.5 | 73.5 | 73.5 | 73.5 | 73.5 |
| EMAC SP 2220 | 24.5 | 24.5 | 24.5 | 24.5 | 24.5 | 24.5 |
| Pigment conc. | 2.0 | 2.0 | 2.0 | 2.0 | 2.0 | 2.0 |
| Core | | | | | | |
| Bscorene 3445 | 43 | | | | | 43 |
| Vestoplast 750 | 43 | | | | | 43 |
| Himont KS-075 | | 77.5 | | 77.5 | | |
| Fusabond 110D | | 8.5 | | 8.5 | | |
| Ultramid B3 | | | 100 | | 100 | |
| Mg(OH)$_2$$^{(a)}$ | 12.0 | 12.0 | | 12.0 | | 12.0 |
| Pigment conc. | 2.0 | 2.0 | | 2.0 | | 2.0 |
| Backing Sheet | | | | | | |
| Elvax 350 | 75.0 | 75.0 | 75.0 | | | |
| EMAC SP 2220 | 25.0 | 25.0 | 25.0 | | | |
| Elvax 260 | | | | 80.0 | 80.0 | 19.8 |
| Primacor 3460 | | | | 20.0 | 20.0 | 79.2 |
| Foaming agent$^{(b)}$ | | | | | | 1.0 |

$^{(a)}$The Mg(OH)$_2$ was a mixture of equal parts of Mg(OH)$_2$ and Elvax 350.
$^{(b)}$The foaming agent was Safoam ™ RIC50.

Example 15

To demonstrate that the processes of this invention do not impart significant orientation to the filaments produced thereby (i.e., they are essentially undrawn) or articles made therefrom, the unoriented, macrodenier sheath-core filaments of Lots J, K, and L were prepared and analyzed for degree of orientation. The filaments were prepared using the process described in Example 1 except for the differences noted hereafter. Web of the filaments of Lot J was prepared in the same fashion as Example 3 except that the sheath contained 2 parts of pigment concentrate per 100 parts of sheath precursor and the core was prepared from a blend of 77.5 wt % Himont KS-075 ethylene-propylene graft copolymer; 8.5 wt % Fusabond MB-110D linear, low density, maleic anhydride-graft-polyethylene; 12 wt % magnesium hydroxide concentrate (equal amounts of magnesium hydroxide and Elvax 260 ethylene-vinyl acetate copolymer), and 2 wt % color pigment concentrate. Web of filaments of Lot K was prepared in the same fashion as Example 2 except that the sheath contained 2 parts of pigment concentrate per 100 parts of sheath precursor and the magnesium hydroxide fire retardant of the core component was dispersed in Elvax 260 instead of polypropylene. The tow of filaments of Lot L was prepared in the same fashion as Example 1 except that the sheath contained 2 parts of pigment concentrate per 100 parts of sheath precursor. Instead of allowing the filaments to oscillate or coil and form a web as in the webs of filaments of Lots J and K, the take away speed used to make filaments of Lot L was increased to equal the extrusion speed such that straight filaments resulted. The final diameter of the quenched, sheath-core filaments was 0.712–0.737 mm.

The filaments were pulled by hand (without attenuation) from tack-bonded webs of filaments of Lots J and K and from the tow of filaments of Lot L. The pulled filaments were examined by flat plate x-ray diffraction analysis for molecular orientation using a transmission pinhole camera (a Statton camera as described *Experiments in Polymer Science*, Edward A. Collins, Jan Bares and Fred W. Billmeyer, p. 194, John Wiley and Sons Inc., 1973) with nickel-filtered Cu Kα radiation. The individual filaments were aligned vertically and parallel with respect to the photographic film. The so-analyzed undrawn filaments were then pulled under ambient conditions to the natural draw ratio, that is, elongated (stretched) to the point where further elongation would result in breakage of the filament. The so-drawn filaments were then re-examined by the x-ray diffraction analysis described above.

Examination of the resultant photographic images provided information regarding crystallinity and orientation of the filaments. Crystallinity was evidenced by the presence of rings or arcs. Orientation was evidenced by the presence of arcs, the smaller the arc length, the greater the orientation. Totally unoriented material display concentric rings, called Debye rings (cf. Fred W. Billmeyer Jr., *Textbook of Polymer Science, 2nd Ed.*, p. 114, John Wiley and Sons, Inc., 1971). The results of such analysis is set forth in Table 11 and demonstrate that the undrawn macrodenier multifilaments of this invention are unoriented.

TABLE 11

| Filaments | | X-ray pattern analysis | |
|---|---|---|---|
| LOT | Geometry | Undrawn filament | Drawn filament |
| J | coiled | uniform Debye rings (unoriented) | arcs (well oriented) |
| K | coiled | uniform Debye rings (unoriented) | arcs (well oriented) |
| L | straight | uniform Debye rings (unoriented) | arcs (highly oriented) |

Example 16

Durable, individual, unoriented, multicomponent, macrofilaments were prepared using the process generally outlined in Example 1 except that the speed of the take-away rolls (FIG. 1B) was adjusted to allow each filament to coil slightly without intermingling or contacting adjacent filaments and forming a web as they were quenched and withdrawn from the quench bath. The resulting individual filaments resembled those illustrated in FIG. 4 and show a helical twist to the filament.

In another run using the process generally outlined in Example 1 and the materials of Example 13, straight, individual, undrawn macrofilaments were prepared. The speed of the take-away roll (FIG. 1B) was increased to equal the extrusion speed to allow the filaments to be withdrawn straight but yet undrawn and fully quenched from the quench bath.

Example 17

Four different films, ranging in thickness from 0.3 to 0.38 mm, were prepared by blending 80 to 20 wt % Elvax 260 ethylene vinyl-acetate copolymer with 20 to 80 wt % Primacor 3460 ethylene-acrylic acid copolymer, extruding the blend at 220° C. from a 32 mm single-stage extruder having an L/D of 30/1, through a film die having a 0.5 mm orifice into a film falling 3 mm before being contacted by a set of polished, chilled, nip rolls. The rolls were chilled to 22° C. and the films were collected at a line speed of 1.9 meters/minute. Film samples were allowed to equilibrate at ambient conditions for 168 hours, after which films were evaluated for flex-fatigue resistance according to ASTM D2176-63T, modified to provide a constant 1.14 MPa load. Table 12 illustrates the synergistic improvement of the films made from the blends in flex-fatigue resistance over the films made from the unblended polymers. For comparison, a film of Elvax 260 copolymer and a film of Primacor 3460 copolymer were similarly prepared and evaluated.

TABLE 12

| | Film Composition, Amt. of polymer, wt % | | Flex Fatigue Resistance, |
|---|---|---|---|
| Film | Elvax 260 copolymer | Primacor 3460 copolymer | Cycles to Break, Before Heat Aging |
| A | 0 | 100 | 68,000 |
| B | 20 | 80 | 250,000* |
| C | 40 | 60 | 250,000* |
| D | 60 | 80 | 250,000* |
| E | 80 | 20 | 250,000* |
| F | 100 | 0 | 150,000 |

*Test stopped at 250,000 cycles. No failure was noted.

Similarly, blends of 50 to 80 wt % Elvax 350 ethylene vinyl-acetate copolymer and 50 to 20 wt % Primacor 3460 ethylene-acrylic acid copolymer were extruded into films according to the process described above and evaluated according to ASTM D2176-63T, modified to provide a constant 1.14 MPa load. Table 13 illustrates the effect of heat aging at about 149° C. for 3 minutes.

TABLE 13

| | Film Composition, Amt. of polymer, wt % | | Flex Fatigue Resistance, Cycles to Break | |
|---|---|---|---|---|
| Film | Elvax 350 copolymer | Primacor 3460 copolymer | Before Heat Aging | After Heat Aging |
| H | 80 | 20 | 200,000 | 18,400 |
| I | 50 | 50 | 307,600 | 155,800 |

The data of Tables 12 and 13 show that the blends of Films B, C, D, E, H, and I would be particularly useful as components (a) or (b) in the fabrication of multicomponent filaments of this invention because of their desirable flex-fatigue resistance.

Example 18

Four different films, ranging in thickness from 0.2 to 0.66 mm, were prepared by melt blending 50 g batches of blends of Elvax 350 ethylene-vinyl acetate copolymer and 80 to 20 wt % EMAC SP2220 ethylene-methylacrylate copolymer, using a Brabender mixer fitted with a sigma blade, at 130° C. and 40 RPM for 5 minutes. Each molten polymer blend was removed from the Brabender and pressed between metal plates coated with Teflon™ plastic to form film, using a hydraulic press at 130° C. and 6.89 MPa pressure. The plate-film assemblies were removed from the press and quenched in 16° C. water, the film was removed and allowed to stand in ambient air for about 1 week. The films were evaluated for flex-fatigue resistance according to ASTM D2176-63T, modified to provide a constant stress of 2.46 MPa. For comparison, films of the unblended polymer components were similarly prepared and evaluated. Table 14 sets forth actual flex-fatigue resistance measurements and illustrates the synergistic improvement in flex fatigue resistance of the films of the blends over polymer components per se both before and after heat aging at about 149° C. for 3 minutes. Heat aging of compositions K, M, and N increased flex life.

TABLE 14

| | Film Composition, Amt. of polymer, wt % | | Flex Fatigue Resistance, Cycles to Break | |
|---|---|---|---|---|
| Film | Elvax 350 copolymer | EMAC SP2220 copolymer | Before Heat Aging | After Heat Aging |
| J | 0 | 100 | 24,000 | 13,000 |
| K | 20 | 80 | 31,000 | 97,000 |
| L | 40 | 60 | 106,000 | 70,000 |
| M | 60 | 40 | 46,000 | 86,000 |
| N | 80 | 20 | 7,000 | 69,000 |
| O | 100 | 0 | 18,000 | 8,000 |

Example 19

Five different films ranging in thickness from 0.25 to 74 mm, were prepared by melt-blending 30 to 90 wt % Escorene 3445 isotactic polypropylene with 10 to 70 wt % Vestoplast 750 ethylene-propylene-butene copolymer, according to the process of Example 18, except the blends were mixed at 210° C. in the Brabender mixer. The films were evaluated for flex-fatigue resistance according to ASTM D2176-63T, modified to provide a constant stress of 2.46 MPa. Table 15 sets forth actual flex-fatigue measurements and illustrates the outstanding synergistic improvement in flex-fatigue resistance of the films (after heat aging at about 149° C. for 3 min.) of the blends over the films of the unblended polymer components per se.

TABLE 15

| | Film Composition, Amt. of polymer, wt % | | Flex-Fatigue Resistance, |
|---|---|---|---|
| Film | Escorene 3445 polymer | Vestoplast 750 polymer | Cycles to Break, After Heat Agingp |
| P | 0 | 100 | ** |
| Q | 30 | 70 | 16,000 |
| R | 40 | 60 | 1,000,000* |
| S | 60 | 40 | 1,000,000* |
| T*** | 70 | 30 | 1,000,000* |
| U | 90 | 10 | 158,000 |
| V | 100 | 0 | 196,000 |

*Tests stopped at 1,000,000 cycles. No failure was noted.

TABLE 15-continued

| | Film Composition, Amt. of polymer, wt % | | Flex-Fatigue Resistance, |
|---|---|---|---|
| Film | Escorene 3445 polymer | Vestoplast 750 polymer | Cycles to Break, After Heat Agingp |

**Broke immediately,
***The flex-fatigue resistance cycles to break before heat aging of the film of Lot T was 660,0000.

Various alterations and modifications of this invention will become apparent to those skilled in the art without departing from the scope and spirit of this invention.

What is claimed is:

1. A macrodenier multicomponent filament comprising:
   (a) first plastic comprising synthetic plastic polymer; and
   (b) second plastic comprising lower melting, synthetic thermoplastic polymer having a melting point at least 15° C. lower than the melting point of said component (a);

said components (a) and (b) each having a flex fatigue resistance greater than 200 cycles to break and being, along the length of the filament, undrawn, tough, elongated, contiguous, and coextensive in length, said component (b) defining all or at least part of the material-air boundary of said filament, said filament being durably melt-bondable in its undrawn state.

2. Multicomponent filament according to claim 1, wherein said components (a) and (b) are, along the length of the filament, integral and inseparable.

3. Multicomponent filament according to claim 1 in the form of sheath-core bicomponent filament, the core being said component (a) and the sheath being said component (b).

4. Multicomponent filament according to claim 3, wherein said component (a) is in the form of a plurality of cores of the same composition or different compositions.

5. Multicomponent filament according to claim 3, wherein said core and said sheath are concentric.

6. Multicomponent filament according to claim 3, wherein said core is cellular.

7. Multicomponent filament according to claim 1 in the form of side-by-side filament.

8. Multicomponent filament according to claim 7, wherein said components (a) and (b) are side-by-side alternate layers.

9. Multicomponent filament according to claim 1 having a linear density greater than 200 denier per filament.

10. Multicomponent filament according to claim 1 having a linear density of 500 to 20,000 denier per filament.

11. Multicomponent filament according to claim 1 which is continuous.

12. Multicomponent filament according to claim 1 having a helical shape.

13. Multicomponent filament according to claim 1 further comprising fire retardant dispersed in components (a) and/or (b).

14. Multicomponent filament according to claim 1, wherein said components (a) and (b) have tensile strengths greater than or equal to 3.4 MPa, elongation greater than or equal to 100%, work of rupture greater than or equal to $1.9 \times 10^7$ J/m$^3$; and wherein said component (b) has a melting point greater than 38° C.

15. Multicomponent filament according to claim 1 wherein said component (a) comprises nylon 6 or 6,6 and said component (b) comprises elastomer selected from the group consisting of nylon 11, polyester elastomer, and polyether block polyamide elastomer.

* * * * *